United States Patent
Qin

(10) Patent No.: US 9,843,978 B2
(45) Date of Patent: Dec. 12, 2017

(54) WIRELESS COMMUNICATION SYSTEM AND METHOD THEREIN FOR TRANSFERRING AT LEAST PART OF SERVICES ORIGINALLY PROVIDED BY A SECOND STATION TO A THIRD STATION AND A FIRST BASE STATION IN THE SYSTEM

(71) Applicant: Sony Corporation, Tokyo (JP)

(72) Inventor: Zhongbin Qin, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/296,690

(22) Filed: Oct. 18, 2016

(65) Prior Publication Data
US 2017/0041849 A1 Feb. 9, 2017

Related U.S. Application Data

(63) Continuation of application No. 14/764,027, filed as application No. PCT/CN2014/091867 on Nov. 21, 2014, now Pat. No. 9,717,030.

(30) Foreign Application Priority Data
Nov. 22, 2013 (CN) .......................... 2013 1 0597066

(51) Int. Cl.
*H04W 36/28* (2009.01)
*H04W 36/08* (2009.01)
(Continued)

(52) U.S. Cl.
CPC ....... *H04W 36/28* (2013.01); *H04W 36/0027* (2013.01); *H04W 36/0061* (2013.01); *H04W 36/08* (2013.01); *H04W 36/32* (2013.01)

(58) Field of Classification Search
None
See application file for complete search history.

(56) References Cited

U.S. PATENT DOCUMENTS 7,389,110 B2 * 6/2008 Lee ....................... H04W 36/12
455/436
8,908,640 B2 12/2014 Xiao
(Continued)

FOREIGN PATENT DOCUMENTS

CN 103139911 6/2013
WO 2012/131857 10/2012
(Continued)

OTHER PUBLICATIONS

Notice of Preliminary Rejection issued in Korean Application No. 10-2016-7008978 dated May 23, 2016 (with English translation).
(Continued)

*Primary Examiner* — Anh Ngoc Nguyen
(74) *Attorney, Agent, or Firm* — Oblon, McClelland, Maier & Neustadt, L.L.P.

(57) ABSTRACT

The present disclosure provides a wireless communication system and method therein. The wireless communication system comprises: a first base station, second base station, third base station and user equipment, wherein the first base station and the second base station perform wireless data connections with the user equipment by adopting different carriers, and a trigger node triggers a transfer procedure in the case of judging a preset transfer condition of transferring a service to the third base station is satisfied, wherein the service is provided by the second base station to the user equipment, so that the user equipment releases the wireless data connection with the second base station and establishes the wireless data connection with the third base station, and thus the first base station and the third base station perform wireless data connections with the user equipment by adopt-
(Continued)

ing different carriers, wherein at least part of the service provided by the second base station initially is transferred to the third base station. According to an embodiment of the present disclosure, it can be ensured that the user equipment obtains optimized quality of service, while the efficiency of data transmission is improved.

21 Claims, 15 Drawing Sheets

(51) Int. Cl.
*H04W 36/00* (2009.01)
*H04W 36/32* (2009.01)

(56) References Cited

U.S. PATENT DOCUMENTS

| | | | |
|---|---|---|---|
| 9,357,450 B2* | 5/2016 | Eisl | ............... H04W 36/0072 |
| 2012/0002643 A1 | 1/2012 | Chung et al. | |
| 2012/0177002 A1* | 7/2012 | Faucher | ............... H04W 36/02 370/331 |
| 2012/0294280 A1* | 11/2012 | Bienn | ............... H04W 36/0022 370/331 |
| 2013/0235844 A1 | 9/2013 | Ge et al. | |
| 2013/0273918 A1 | 10/2013 | Watanabe | |
| 2013/0294410 A1* | 11/2013 | Shuai | ............... H04W 36/0066 370/331 |
| 2013/0310037 A1 | 11/2013 | Ji et al. | |
| 2014/0022998 A1 | 1/2014 | Tajima et al. | |
| 2014/0269575 A1 | 9/2014 | Zhang et al. | |
| 2015/0071250 A1 | 3/2015 | Dai et al. | |
| 2015/0223058 A1 | 8/2015 | Yang | |

FOREIGN PATENT DOCUMENTS

| | | |
|---|---|---|
| WO | 2012/139016 A2 | 10/2012 |
| WO | 2013/170789 | 11/2013 |
| WO | 2013/170789 A1 | 11/2013 |
| WO | 2014/103145 A1 | 7/2014 |

OTHER PUBLICATIONS

Notice of Preliminary Rejection issued in Korean Application No. 10-2016-7008978 dated Nov. 30, 2016 (with English translation).
Notice of Allowance issued in Korean Application No. 10-2016-7008978 dated May 19, 2017 (with English translation).
International Search Report dated Mar. 4, 2015 to PCT application No. PCT/CN2014/091867, with English translation.
Written Opinion dated Mar. 4, 2015 to PCT application No. PCT/CN2014/091867, with English translation.

* cited by examiner

WIRELESS COMMUNICATION SYSTEM AND METHOD THEREIN FOR TRANSFERRING AT LEAST PART OF SERVICES ORIGINALLY PROVIDED BY A SECOND STATION TO A THIRD STATION AND A FIRST BASE STATION IN THE SYSTEM

CROSS-REFERENCE TO RELATED APPLICATIONS

This application is a continuation of U.S. patent application Ser. No. 14/764,027, filed Jul. 28, 2015, which is a 371 of International Application No. PCT/CN2014/091867, filed Nov. 21, 2014, which claims priority to Chinese Patent Application No. 201310597066.9, filed Nov. 22, 2013. The entire contents of U.S. patent application Ser. No. 14/764,027 are incorporated herein by reference in their entirety.

FIELD OF THE INVENTION

The present disclosure relates to the field of wireless communication, and particularly, to a wireless communication system and a method used in the wireless communication system.

BACKGROUND OF THE INVENTION

Currently, in a wireless communication system, technology of carrying out wireless data connections with a plurality of base stations over different carriers simultaneously by user equipment has been widely discussed. However, a solution under specific scenes has not been launched.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

Therefore, in view of the above circumstances, an object of the present disclosure is to provide a wireless communication system and a method used in the wireless communication system, which are capable of realizing that in a wireless communication system in which a plurality of base stations perform wireless data connections with user equipment over different carriers simultaneously, if certain conditions are satisfied, the user equipment is triggered to transfer part or all of radio bearers between the user equipment and some base stations to other base stations. Thus, it is possible to ensure the user equipment obtains ideal service quality from the base stations, and effectively improve uplink and downlink data transmission efficiency.

According to an aspect of the invention, there is provided a wireless communication system including a first base station, a second base station, a third base station and user equipment, in which the first base station and the second base station perform wireless data connection with the user equipment over different carriers, and a triggering node triggers a transfer procedure if it judges a predetermined transfer condition for transferring services provided to the user equipment by the second base station to the third base station is satisfied, so that the user equipment releases wireless data connection with the second base station and establishes wireless data connection with the third base station, and thus the first base station and the third base station perform wireless data connection with the user equipment over different carriers, wherein at least part of the services originally provided by the second base station is transferred to the third base station.

According to a preferred embodiment of the invention, the transfer procedure may further cause part of the services originally provided by the second base station to be transferred to the first base station.

According to another preferred embodiment of the invention, the triggering node may be the first base station or the second base station.

According to another preferred embodiment of the invention, the triggering node sends a transfer request to the third base station if it judges the predetermined transfer condition is satisfied according to a received mobility measurement result regarding a serving carrier of the second base station, the third base station performs a first admission control according to the transfer request and sends a transfer response to the first base station and/or the second base station to notify a result of the first admission control, in which the transfer response comprises at least one of the following: for which part of radio bearer of the user equipment that the third base station can perform communication, a dedicated preamble code as required when making synchronized access to the third base station, system information of a carrier for communication between the user equipment and the third base station, and configuration information of a control plane protocol for establishing communication between the user equipment and the third base station.

According to another preferred embodiment of the invention, if the result of the first admission control indicates that the third base station can not accept all radio bearers between the user equipment and the second base station, then according to the transfer response sent by the third base station or the transfer response sent by the third base station and forwarded to the first base station via the second base station, the first base station performs a second admission control according to the result of the first admission control and notifies the second base station of a result of the second admission control.

According to another preferred embodiment of the invention, the first base station or the second base station sends, after acquiring a final result of the first admission control or the second admission control, a notification message to the user equipment to notify the user equipment to perform the transfer procedure according to the final result and the transfer response of the third base station, the notification message comprising at least one of the following: for which part of radio bearer of the user equipment that the first base station can perform communication, for which part of the radio bearer of the user equipment that the third base station can perform communication, a dedicated preamble code as required when making synchronized access to the third base station, system information of a carrier for communication between the user equipment and the third base station, and configuration information of a control plane protocol for establishing communication between the user equipment and the third base station, and the user equipment releases, after receiving the notification message, radio bearers unacceptable by the first base station and the third base station, and releases the wireless data connection with the second base station and performs synchronized access to the third base station at the same time.

According to another embodiment of the invention, if data of the first, second and third base stations is directly routed from a core network before triggering the transfer procedure and after completing triggering of the transfer procedure, the second base station performs data forwarding operation to forward data of a first radio bearer acceptable by the third base station to the third base station according to the result of the first admission control, and further performs data forwarding operation to forward data of a second radio bearer acceptable by the first base station to the first base station according to the result of the second admission control, and the first base station or the second base station notifies the core network to switch a path corresponding to the second radio bearer to the first base station.

Preferably, if synchronized access to the third base station by the user equipment succeeds, the third base station notifies the core network to switch a path corresponding to the first radio bearer to the third base station; otherwise, if the synchronized access to the third base station by the user equipment fails, the user equipment notifies the first base station, and the first base station notifies the second base station and the third base station after performing a third admission control, so that data of a third radio bearer acceptable by the first base station in the first radio bearer is forwarded to the first base station, and the first base station notifies the core network to switch a path corresponding to the third radio bearer to the first base station and to release a core network bearer corresponding to a radio bearer unacceptable by the first base station in the first radio bearer, and notifies the user equipment to release the radio bearer unacceptable by the first base station in the first radio bearer at the same time.

According to another preferred embodiment of the invention, if data of the second base station is forwarded from the first base station, the first base station stops forwarding data to the second base station after completing confirmation of the first admission control or after completing the second admission control, and the second base station performs data forwarding operation to forward data of the first radio bearer acceptable by the third base station to the third base station according to the result of the first admission control, and further performs data forwarding operation to forward data of the second radio bearer acceptable by the first base station to the first base station according to the result of the second admission control.

Preferably, the first base station performs data forwarding operation to forward the data of the first radio bearer to the third base station after completing confirmation of the first admission control, or the first base station performs data forwarding operation to forward the data of the first radio bearer to the third base station after receiving a message that synchronized access to the third base station by the user equipment succeeds.

Further, preferably, if the synchronized access to the third base station by the user equipment fails, the user equipment notifies the first base station, the first base station stops forwarding data to the third base station, and the first base station notifies the second base station and the third base station after completing a third admission control so that data of a third radio bearer acceptable by the first base station in the first radio bearer is forwarded to the first base station and a radio bearer unacceptable by the first base station in the first radio bearer is released, and notifies the user equipment to release the radio bearer unacceptable by the first base station in the first radio bearer at the same time.

Further, preferably, if data of the third base station is directly routed from a core network after completing triggering of the transfer procedure and the synchronized access to the third base station by the user equipment succeeds, the third base station further notifies the core network to modify a core network bearer corresponding to the first radio bearer acceptable by the third base station so that data of the first radio bearer is directly routed to the third base station.

According to another preferred embodiment of the invention, if data of the first base station is forwarded via the second base station, the second base station performs data forwarding operation to forward data of the first radio bearer acceptable by the third base station to the third base station according to the result of the first admission control, and performs data forwarding operation to forward data of the second radio bearer acceptable by the first base station to the first base station according to the result of the second admission control.

Preferably, if synchronized access to the third base station by the user equipment succeeds, the third base station triggers a core network to perform path switch so that data sent to the second base station from the core network is directly routed to the third base station, the third base station starts forwarding data of a downlink bearer transmitted via the first base station to the first base station after completing the path switch, and the second base station releases information relating to the user equipment and its services after completing data forwarding operation.

Further, preferably, if synchronized access to the third base station by the user equipment fails, the user equipment notifies the first base station, the first base station notifies the second base station and the third base station after a third admission control so that data of a third radio bearer acceptable by the first base station in the first radio bearer and data of original services of the first base station is forward to the first base station via the second base station, and notifies the user equipment at the same time, and the second base station stops forwarding data to the third base station after acquiring that the synchronized access fails.

Further, preferably, if the synchronized access to the third base station by the user equipment fails, after completing the third admission control by the first base station, the first base station or the second base station notifies the core network to switch a path for data forwarded to the first base station via the second base station to the first base station and release a core network bearer corresponding to a radio bearer unacceptable by the first base station in the first radio bearer, and notifies the user equipment to release the radio bearer unacceptable by the first base station in the first radio bearer at the same time.

According to another aspect of the invention, there is provided a method used in a wireless communication system, the wireless communication system including a first base station, a second base station, a third base station and user equipment, wherein the first base station and the second base station perform wireless data connection with the user equipment over different carriers, the method including: a judging step of judging, by a triggering node, whether a predetermined transfer condition for transferring services provided to the user equipment by the second base station to the third base station is satisfied; and a triggering step of triggering the transfer procedure if it is judged that the predetermined transfer condition is satisfied, so that the user equipment releases wireless data connection with the second base station and establishes wireless data connection with the third base station, and thus the first base station and the third base station perform wireless data connection with the user equipment over different carriers, wherein at least part of the services originally provided by the second base station is transferred to the third base station.

According to another aspect of the invention, there is also provided a storage medium including machine readable program codes which when executed on an information processing apparatus, cause the information processing apparatus to perform the following steps: a judging step of judging, by a triggering node, whether a predetermined transfer condition for transferring services provided to user equipment by a second base station to a third base station is satisfied, and a triggering step of triggering the transfer procedure if it is judged that the predetermined transfer condition is satisfied, so that the user equipment releases wireless data connection with the second base station and establishes wireless data connection with the third base station, and thus a first base station and the third base station perform wireless data connection with the user equipment over different carriers, wherein at least part of the services originally provided by the second base station is transferred to the third base station. Particularly, the first base station, the second base station, the third base station and the user equipment are included in a wireless communication system, and the first base station and the second base station perform wireless data connection with the user equipment over different carriers.

According to another aspect of the invention, there is also provided a program product including machine executable instructions which when executed on an information processing apparatus cause the information processing apparatus to perform the following steps: a judging step of judging, by a triggering node, whether a predetermined transfer condition for transferring services provided to user equipment by a second base station to a third base station is satisfied; and a triggering step of triggering the transfer procedure if it is judged that the predetermined transfer condition is satisfied, so that the user equipment releases wireless data connection with the second base station and establishes wireless data connection with the third base station, and thus a first base station and the third base station perform wireless data connection with the user equipment over different carriers, wherein at least part of the services originally provided by the second base station is transferred to the third base station. Particularly, the first base station, the second base station, the third base station and the user equipment are included in a wireless communication system, and the first base station and the second base station perform wireless data connection with the user equipment over different carriers.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE INVENTION

Figure 1:
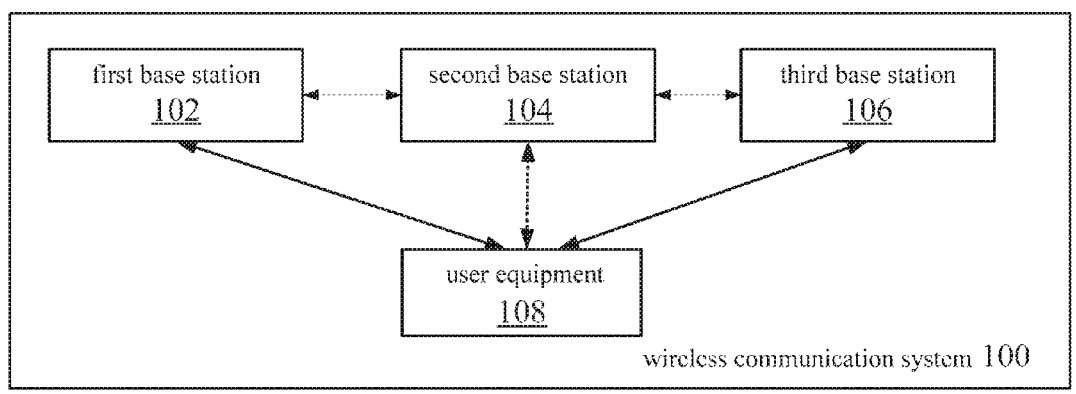
FIG. 1 is a schematic block diagram illustrating a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and service-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Embodiments of the disclosure will be described with reference to FIGS. 1-17 below. First, an example of a wireless communication system according to an embodiment of the disclosure will be described with reference to FIG. 1. FIG. 1 is a schematic block diagram illustrating a wireless communication system according to an embodiment of the disclosure.

As shown in FIG. 1, the wireless communication system 100 according to the embodiment of the disclosure may include a first base station 102, a second base station 104, a third base station 106 and user equipment 108. Particularly, the first base station 102 and the second base station 104 perform wireless data connection with the user equipment 108 over different carriers, and a triggering node triggers a transfer procedure if it judges a predetermined transfer condition for transferring services provided to the user equipment 108 by the second base station 104 to the third base station 106 is satisfied, so that the user equipment 108 releases wireless data connection with the second base station 104 and establishes wireless data connection with the third base station 106, and thus the first base station 102 and the third base station 106 perform wireless data connection with the user equipment 108 over different carriers, and at least part of the services originally provided by the second base station 104 is transferred to the third base station 106.

The predetermined transfer condition under which the services provided to the user equipment 108 by the second base station 104 is transferred to the third base station 106 includes one or more of the following factors: service quality of the third base station 106 is higher than service quality of the second base station 104 by a predetermined threshold; the service quality of the third base station 106 is higher than a predetermined threshold; the service quality of the second base station 104 is lower than a first predetermined threshold and the service quality of the third base station 106 is higher than a second predetermined threshold; and so on. It is to be understood that the above predetermined transfer condition has been described assuming that an object to be transferred has been determined among the first base station 102 and the second base station 104.

On the other hand, when both base stations which perform wireless data connection with the user equipment over different carriers satisfy the predetermined transfer condition at the same time, in a case that it has not been determined which base station is to be transferred first (that is, during a two-step transfer procedure, which base station is the first base station 102, which base station is the second base station 104 and which base station is the third base station 106), as an alternative example, the above described predetermined transfer condition may further include for example the service quality of one base station is higher than that of another base station.

Preferably, when determining the object to be transferred among the above two base stations, measurement results regarding serving carriers of these two base stations should be reported to the triggering node, then the triggering node will determine the transfer procedure with respect to which base station is to be started first based on a type of the base station (for example, master node/slave node, macro base station/low power node, and the like), channel quality or load condition or the like. As an alternative example, if the channel quality of one base station is lower than a predetermined threshold and approximates failure while another base station is looking for a better neighbor, then a base station with poorest channel quality is determined as the object to be transferred, and the transfer procedure with respect to this base station is started first. As another alternative example, if two base stations have substantially the same channel quality, then a base station with heavier load will be determined as the object to be transferred, and the transfer procedure with respect to this base station is started first.

Further, preferably, in a case that all of the services originally provided by the second base station 104 can not be transferred to the third base station 106, the transfer procedure further causes part of the services originally provided by the second base station 104 to be transferred to the first base station 102. It is to be noted that although FIG. 1 shows only one first base station 102, the number of the first base station 102 is not limited thereto, and the first base station 102 may be a set of base stations including a plurality of first base stations, for example, a plurality of coordinated base stations in Joint Processing technology, and thus during the above transfer procedure, part of the services originally provided by the second base station 104 may be transferred to one or more first base stations in the set of base stations. Further, in this case, the service quality of the plurality of first base stations is measured in a cell unit, for example, in case of Coordinated Multiple Point (CoMP) transmission, the service quality of multiple coordinated base stations may be measured by regarding a carrier coordinated by the multiple base stations as one cell.

Further, it is to be understood that during the above transfer procedure, the first base station 102 always maintains the wireless data connection with the user equipment, the services provided by the second base station 104 is transferred, and at least part of the services originally provided by the second base station 104 is transferred to the third base station 106, and thus in some embodiments of the invention, the first base station 102 may be also referred to as a connection maintaining node, the second base station 104 may be also referred to as a connection transfer source node, and the third base station 106 may be also referred to as a connection transfer target node. The above described triggering node may be one serving node to which the user equipment 108 is connected currently, for example, may be the first base station 102 as the connection maintaining node, and may be also the second base station 104 as the connection transfer source node.

Further, it is to be understood that the terms "first", "second" and "third" used herein are only used for distinguishing to facilitate description but not limitation, for example, when the first base station 102 conforms to characteristics of the connection transfer source node or the connection transfer target node, the first base station 102 can of course be the connection transfer source node or the connection transfer target node, and this also applies to the second base station 104 and the third base station 106.

Specifically, in a case that the triggering node judges the predetermined transfer condition is satisfied according to mobility measurement result regarding serving carriers of at least the second base station 104 and optionally the first base station 102 and the third base station 106, the triggering node sends a transfer request containing relevant information of the first base station and the second base station to the third base station 106, and the third base station 106 performs a first admission control according to the transfer request and sends a transfer response to notify a result of the first admission control. Particularly, the third base station 106 may return the transfer response directly to the triggering node, or may send the transfer response to another serving node connected with the user equipment 108.

Preferably, the transfer response may include for which part of radio bearer of the user equipment 108 that the third base station 108 can perform communication, a dedicated preamble code as required when making synchronized access to the third base station 106, system information about a carrier for communication between the user equipment 108 and the third base station 106 and configuration information about a control plane protocol for establishing communication between the user equipment 108 and the third base station 106.

Preferably, if the result of the first admission control indicates that the third base station 106 can not accept all the radio bearers between the user equipment 108 and the second base station 104, then according to the transfer response of the third base station 106 (the transfer response directly received from the third base station 106 or the transfer response of the third base station 106 forwarded to the first base station 102 via the second base station 104), the first base station 102 performs a second admission control according to the result of the first admission control and notifies a result of the second admission control to the second base station 104.

Further, preferably, the first base station 102 or the second base station 104 sends, after acquiring the final result of the first admission control or the second admission control, a notification message to the user equipment 108 to notify the user equipment 108 to perform the transfer procedure according to the final result and the transfer response of the third base station 106. The notification message includes at least one of: for which part of radio bearer of the user equipment that the first base station 102 can perform communication, for which part of radio bearer of the user equipment 108 that the third base station 106 can perform communication, a dedicated preamble code as required when making synchronized access to the third base station 106, system information about a carrier for communication between the user equipment 108 and the third base station 106 and configuration information about a control plane protocol for establishing communication between the user equipment 108 and the third base station 106. Also, the user equipment 108 releases radio bearers which can not be accepted by the first base station 102 and the third base station 106 after receiving the notification message, releases the wireless data connection with the second base station 104 and performs synchronized access operation to the third base station 106.

Further, preferably, the above described triggering node may be the first base station 102 or the second base station 104.

Figure 2:
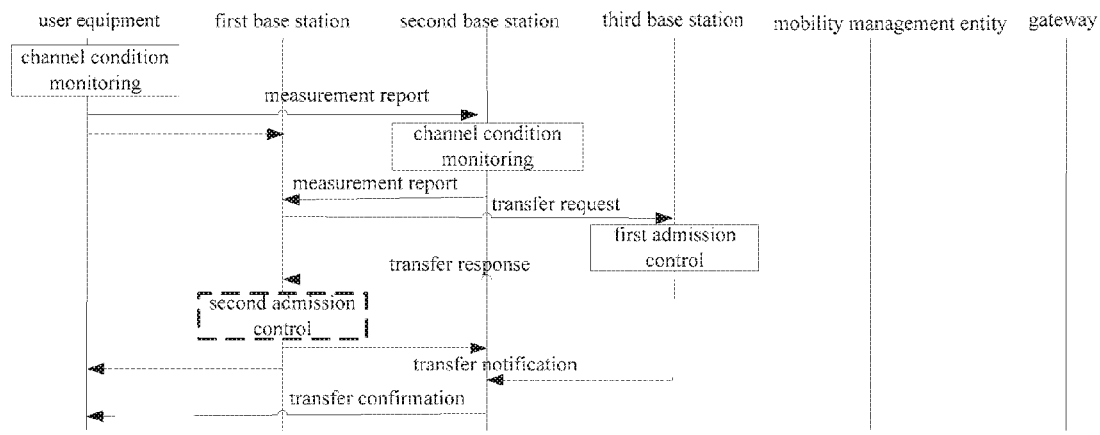
FIG. 2 is a schematic diagram illustrating an exemplary scene in which a first base station serves as a triggering node to trigger a transfer procedure according to an embodiment of the disclosure.
Figure 3:
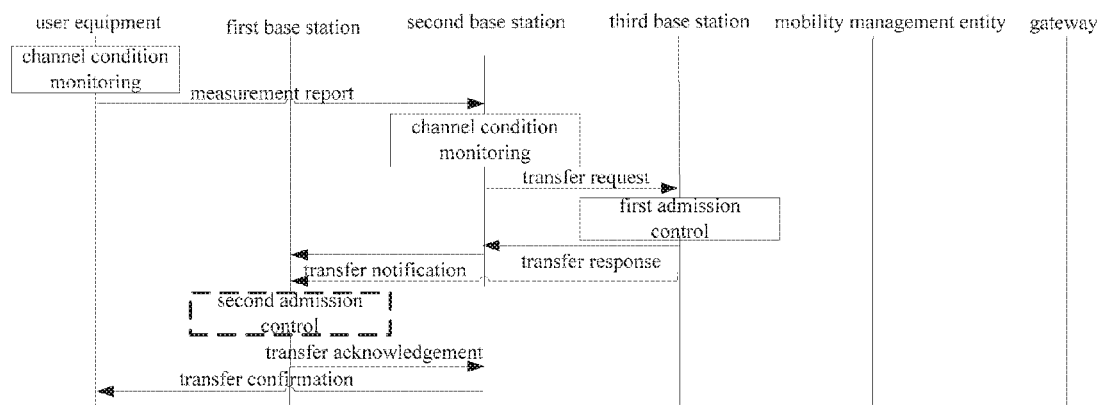
FIG. 3 is a schematic diagram illustrating an exemplary scene in which a second base station serves as a triggering node to trigger a transfer procedure according to an embodiment of the disclosure.

Examples of scenes of the transfer procedure in cases that the first base station 102 and the second base station 104 serve as the triggering node respectively will be described with reference to FIGS. 2 and 3 below. FIG. 2 is a schematic diagram illustrating an exemplary scene in which the first base station serves as the triggering node to trigger the transfer procedure according to an embodiment of the disclosure, and FIG. 3 is a schematic diagram illustrating an exemplary scene in which the second base station serves as the triggering node to trigger the transfer procedure according to an embodiment of the disclosure.

As shown in FIG. 2, in a case that the first base station 102 serves as the triggering node, the user equipment 108 may send the mobility measurement result to the second base station 104, and the second base station 104 forwards the mobility measurement result to the first base station 102 as shown by solid-line arrows in FIG. 2 as reference for the first base station 102 to trigger the transfer procedure. An advantage of this example lies in reducing modifications to the existing standard (the user equipment directly reports to a serving base station the mobility carrier measurement result of the serving base station). Further, the user equipment 108 may also send the mobility measurement result regarding a serving carrier (containing at least a primary carrier) of the second base station 104 to the first base station 102 in "measurement report" for example, as shown by a broken-line arrow in FIG. 2. An advantage of this example lies in that the user equipment 108 may directly send the measurement report regarding the serving carrier of the second base station 104 to the first base station 102, thereby saving information interaction between the second base station 104 and the first base station 102.

Next, the first base station 102 may send a transfer request to the third base station 106 in "transfer request" for example after judging the above predetermined transfer condition is satisfied according to the received information of the mobility measurement result, then the third base station 104 performs the first admission control according to the transfer request, and sends a response to the transfer request to the first base station 102 in "transfer response" for example so as to notify the result of the first admission control to the first base station 102. The result of the first admission control indicates whether the third base station 106 can accept all the radio bearers between the user equipment 108 and the second base station 104 or which part of the radio bearers can be accepted by the third base station 106.

Thereafter, the first base station 102 or the third base station 106 notifies the result of the first admission control to the second base station 104 in "transfer notification" for example, and the first base station 102 or the second base station 104 notifies the user equipment 108 to perform the transfer procedure in "transfer confirmation" for example according to the result and the transfer response of the third base station 106. The specific contents contained in the notification message "transfer confirmation" have been described above, and no repeated description will be made herein.

Preferably, if the result of the first admission control performed by the third base station 106 indicates that the third base station 106 can not accept all the radio bearers between the user equipment 108 and the second base station 104, the first base station 102 may perform the second admission control according to the result of the first admission control contained in the received "transfer response", as shown by broken-line block in FIG. 2. It is to be understood that by performing the second admission control by the first base station 102 to transfer at least part of the radio bearers that can not be accepted by the third base station 106 to the first base station 102, it is possible to further ensure the user equipment 108 obtains excellent service quality. This is merely a preferred example of course but not limitation, and it is also possible to directly notify the user equipment 108 to release the services unacceptable by the third base station 108 after performing the first admission control, without performing the second admission control by the first base station 102. After judging through the first admission control and/or the second admission control, the second base station 104 releases the radio bearers which are originally transmitted by the second base station 104 and which can not be accepted by the third base station 106 and the first base station 102, and notifies the core network to release core network bearers corresponding to the radio bearers.

It is to be noted that in this case, the first base station 102 may notify the final result about the first admission control and the second admission control to the second base station 104 in "transfer notification" for example after performing the second admission control, then the first base station 102 or the second base station 104 notifies the final result to the user equipment 108 in "transfer confirmation" for example, and thus the radio bearer acceptable by the third base station can be transferred to the third base station 106 and the radio bearer acceptable by the first base station 102 can be transferred to the first base station 102.

After receiving the above notification message "transfer confirmation", the user equipment 108 releases the services that can not be accepted by the first base station 102 and the third base station 106, releases the wireless data connection with the second base station 104 and performs the synchronized access operation to the third base station 106.

A basic signaling flow of the transfer procedure in a case that the first base station 102 serves as the triggering node has been described in detail with reference to FIG. 2 above, and next, an example of a scene of the transfer procedure in a case that the second base station 104 serves as the triggering node will be described in detail with reference to FIG. 3.

As shown in FIG. 3, since the triggering node is the second base station 104 at this time, the user equipment 108 only needs to notify the carrier mobility measurement result to the second base station 104, and the second base station 104 sends the transfer request to the third base station 106 after judging the predetermined transfer condition is satisfied according to the measurement result so as to trigger the transfer procedure. Then, the third base station 106 sends to the second base station 104 a response message "transfer response" for the transfer request after performing the first admission control, so as to notify the result of the first admission control to the second base station 104. Next, the second base station 104 or the third base station 106 may notify the result to the first base station 102, and the second base station 104 sends the notification message to the user equipment 108 in "transfer confirmation" according to the received "transfer response".

Preferably, similar to the case described in FIG. 2, the first base station 102 may also perform the second admission control according to the received result of the first admission control. Specifically, when the "transfer response" of the third base station 106 received by the second base station 104 indicates that the third base station 106 can not accept all the radio bearers between the user equipment 108 and the second base station 104, the second base station 104 sends "transfer request" to the first base station 102 with respect to the radio bearers that can not be by the third base station 106, the first base station 102 performs the second admission control according to the "transfer request" and notifies the final result of the admission control to the second base station 104 in "transfer response" for example. Then, the second base station 104 sends a notification to the user equipment 108 according to the final result. In this example, the "transfer response" sent by the first base station includes for which part of the radio bearers of the user equipment that the first base station 102 can perform communication.

As can be seen from comparison of FIGS. 2 and 3, the transfer procedures in these two cases are similar to each other, and the difference only lies in that the base stations serving as the triggering node are different, thereby leading to differences in transmitting and receiving nodes and timings for some signaling. Therefore, parts which are not described in detail in FIG. 3 can be referred to FIG. 2, and no repeated description will be made herein.

Examples of scenes for basic signaling interactions of the transfer procedure in different cases have been described in detail with reference to FIGS. 2 and 3, and examples of scenes for data forwarding and path switch among network nodes in different cases after the basic signaling interaction of the transfer procedure will be described in detail with reference to FIGS. 4-9 below.

Figure 4:
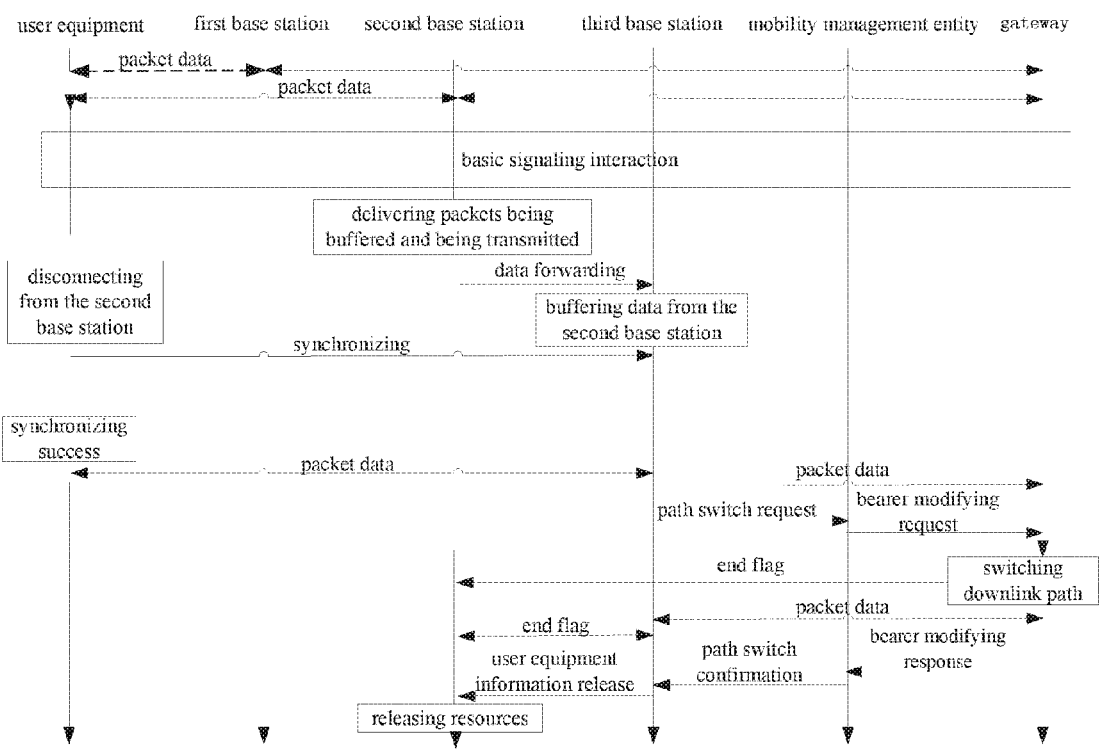
FIG. 4 is a schematic diagram illustrating an exemplary scene in a case that data of first, second and third base stations is directly routed from a core network before triggering a transfer procedure and after completing triggering of the transfer procedure and synchronized access to the third base station by user equipment succeeds according to an embodiment of the disclosure.

FIG. 4 is a schematic diagram illustrating an exemplary scene in a case that the data of the first, second and third base stations is directly routed from the core network before triggering the transfer procedure and after completing triggering of the transfer procedure and synchronized access to the third base station by the user equipment succeeds according to an embodiment of the disclosure.

Specifically, if the data of the first base station 102, the second base station 104 and the third base stations 106 is directly routed from the core network before triggering the transfer procedure and after completing triggering of the transfer procedure, the second base station 104 performs data forwarding operation to forward data of a first radio bearer acceptable by the third base station 106 to the third base station 106 according to the result of the first admission control, and further performs data forwarding operation to forward data of a second radio bearer acceptable by the first base station 102 to the first base station 102 according to the result of the second admission control, and the first base station 102 or the second base station 104 notifies the core network to switch a path corresponding to the second radio bearer to the first base station 102.

It is to be noted that if the result of the first admission control indicates that the third base station 106 can accept all the radio bearers, then only data of the first radio bearer accepted by the third base station 106 is needed to be forwarded to the third base station 106, otherwise, data of the second radio bearer accepted by the first base station 102 also needs to be forwarded to the first base station 102 at the same time.

After the data forwarding operation, as shown in FIG. 4, if the synchronized access to the third base station 106 by the user equipment 108 succeeds, the third base station 106 notifies the core network to switch a path corresponding to the first radio bearer to the third base station 106. Specifically, the third base station 106 may send "path switch request" for example to a mobility management entity (MME). After receiving the request, the mobility management entity sends "bearer modifying request" for example to a gateway, and after receiving the request, the gateway performs switching downlink path operation and thus the data of the first radio bearer acceptable by the third base station 106 is directly routed to the third base station 106, and the gateway sends to the second base station 104 an end flag to inform a number of a last data packet forwarded to the third base station 106 via the second base station 104. Thereafter, the gateway sends "bearer modifying response" for example to the mobility management entity, and meanwhile, after receiving the response, the mobility management entity sends "path switch confirmation" for example as confirmation for the path switch request. Then, the third base station 106 may notify the second base station 104 to release relevant user equipment information, and the second base station 104 may release the resources related to the user equipment 108 and services thereof after receiving the notification.

Figure 5:
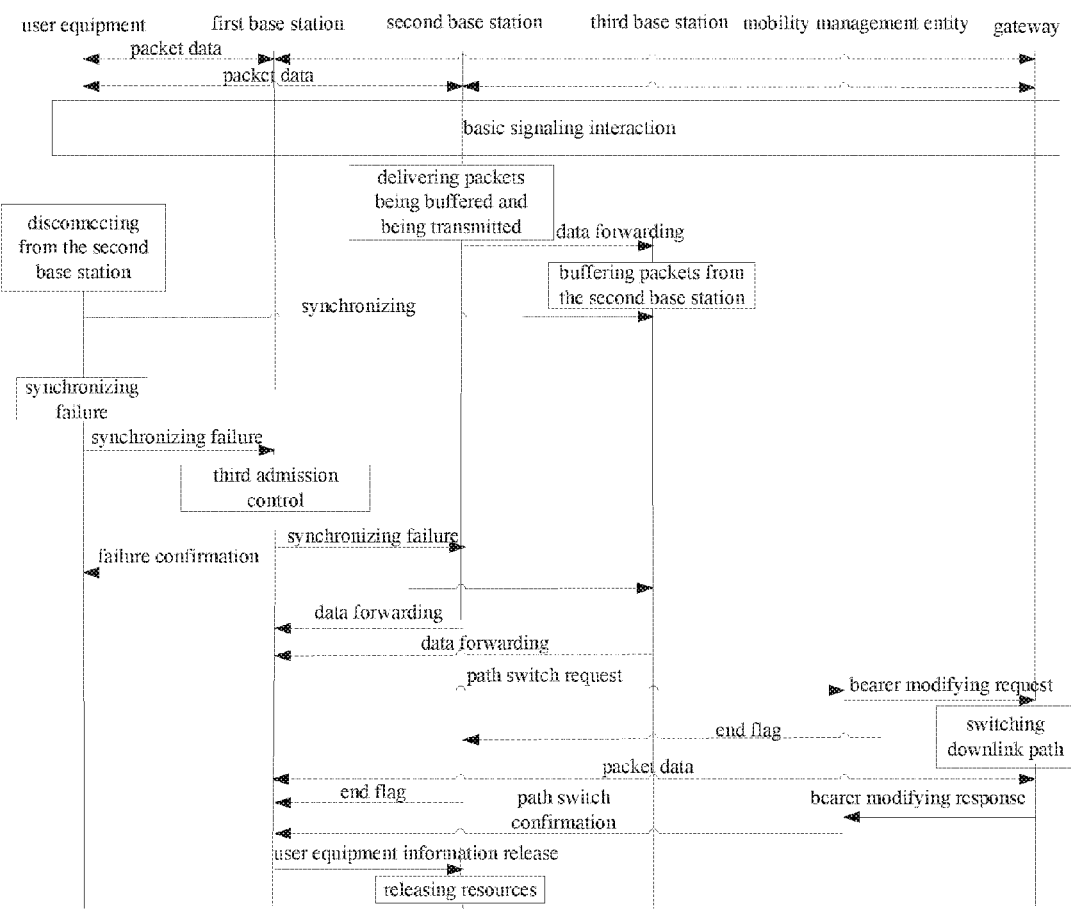
FIG. 5 is a schematic diagram illustrating an exemplary scene in a case that data of a second base station comes directly from a core network and synchronized access to a third base station by user equipment fails according to an embodiment of the disclosure.

Otherwise, as shown in FIG. 5, if the synchronized access to the third base station 106 by the user equipment 108 fails, the user equipment 108 will notify the first base station 102, and the first base station 102 performs a third admission control to perform admission control on the first radio bearer and notifies the second base station 104 and the third base station 106 after the third admission control, to notify the failure of the synchronized access and cause data of a third radio bearer acceptable by the first base station 102 in the first radio bearer to be forwarded to the first base station 102. The first base station 102 also notifies the core network to switch a path corresponding to the third radio bearer to the first base station 102. Meanwhile, the first base station 102 notifies the user equipment 108 of which data can be transmitted over carriers of the first base station 102 and which data needs to be released, notifies the second base station 104 and the third base station 106 of which radio bearers should be released and notifies the core network to release core network bearers corresponding to the radio bearers.

It is to be noted that in a case that the synchronized access fails, as shown in FIG. 5, except that the mobility management entity is notified by the first base station 102 at this time, specific path switch operations related to the core network end are similar to the procedure as described above with reference to FIG. 4, and thus, no repeated description will be made herein.

As can be seen from the above description with reference to FIGS. 4 and 5, for the second radio bearer determined according to the result of the second admission control performed by the first base station 102, irrespective of success or failure of the synchronized access to the third base station 106 by the user equipment 108, the core network is notified to switch corresponding path to the first base station 102. As for the first radio bearer determined according to the result of the first admission control performed by the third base station 106, only if the synchronized access to the third base station 106 by the user equipment 108 succeeds, the core network is notified to switch path corresponding to the first radio bearer to the third base station 106, and if the synchronized access fails, the first base station 102 performs the third admission control for the first radio bearer and notifies the core network to switch path corresponding to the third radio bearer determined according to the result of the third admission control to the first base station 102. That is to say, for the services corresponding to the second radio bearer and the third radio bearer which are originally provided by the second base station 104, the first base station 102 provides these services at this time. Further, in a case that the synchronized access fails, it also needs to notify the user equipment 108 that the third radio bearer should be transferred to the first base station 102 for transmission and to notify the user equipment 108 to release the radio bearers unacceptable by the first base station 102 after the third admission control.

Figure 6A:
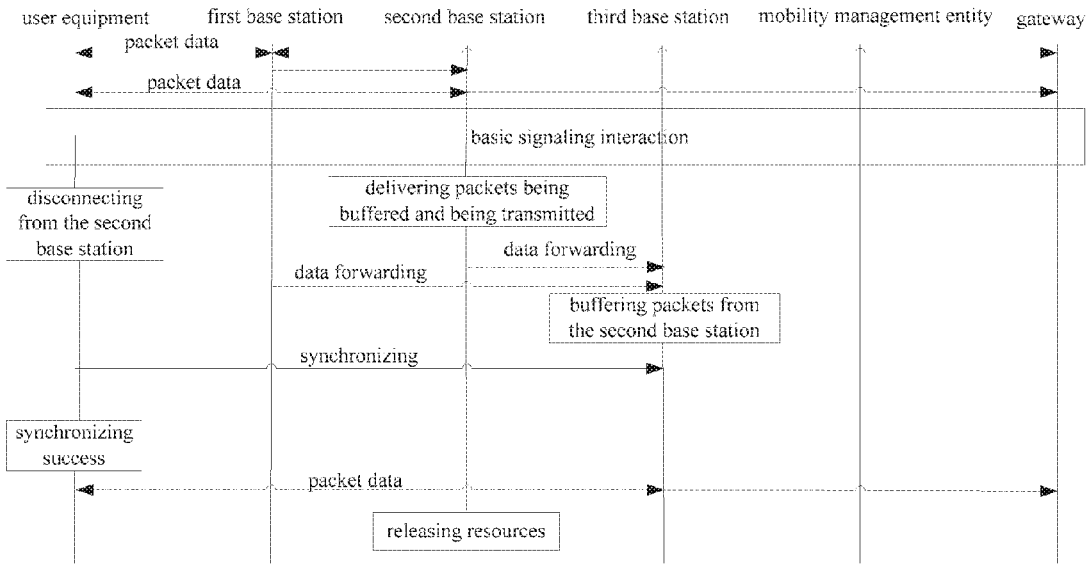
FIG. 6A is a schematic diagram illustrating an exemplary scene in a case that data of a second base station and a third base station is forwarded via a first base station and synchronized access to the third base station by user equipment succeeds according to an embodiment of the disclosure.
Figure 6B:
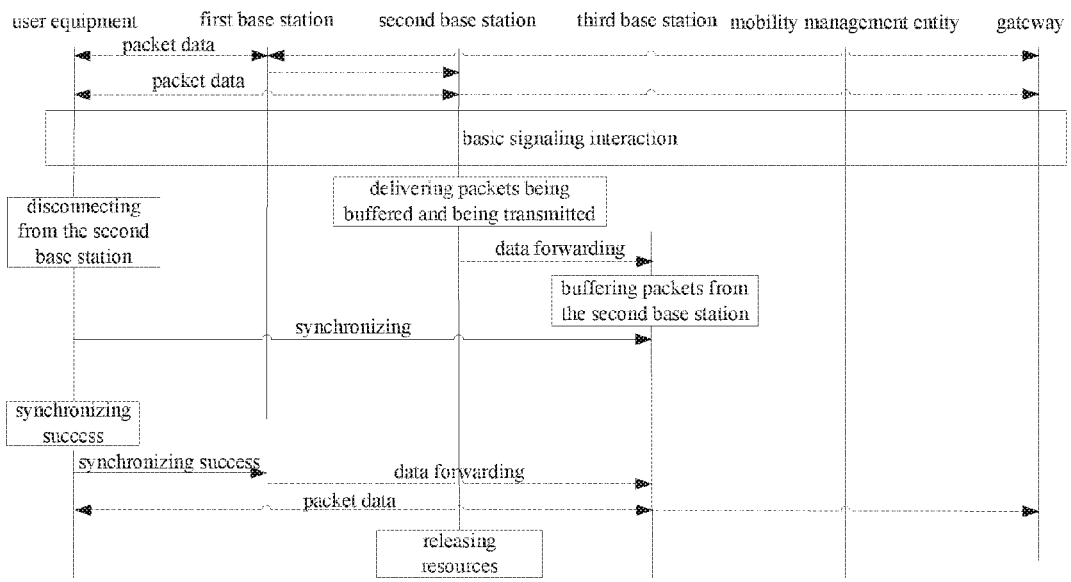
FIG. 6B is a schematic diagram illustrating another exemplary scene in a case that data of a second base station and a third base station is forwarded via the first base station and synchronized access to the third base station by user equipment succeeds according to an embodiment of the disclosure.
Figure 6C:
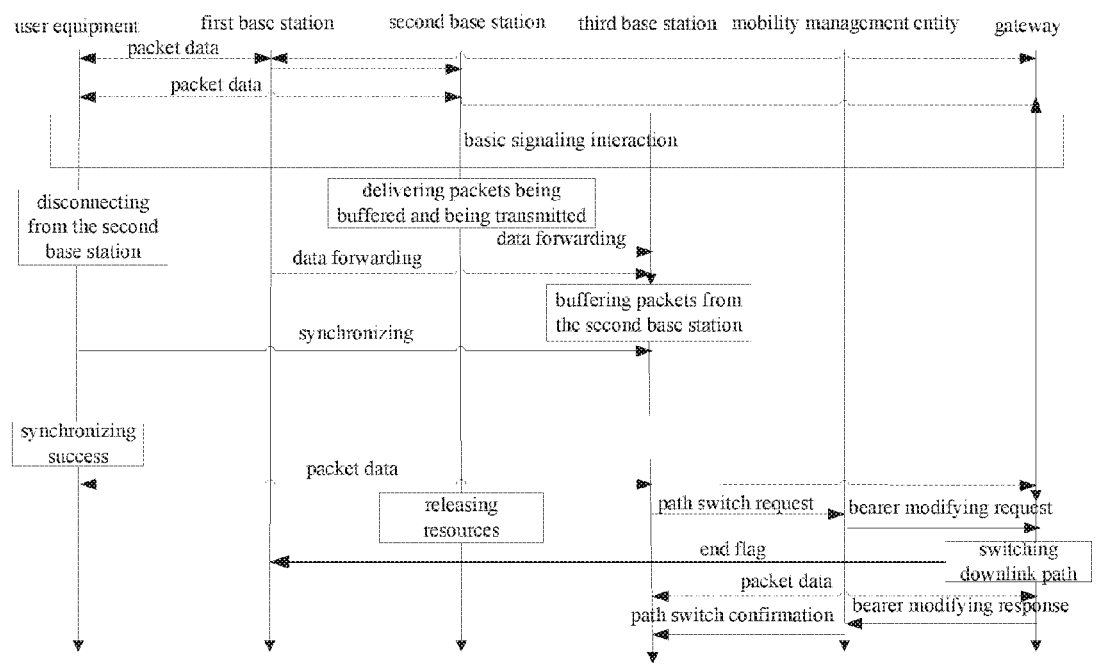
FIG. 6C is a schematic diagram illustrating an exemplary scene in a case that data of a second base station is forwarded via the first station while data of a third base station is directly routed from the core network after completing triggering of a transfer procedure and synchronized access to the third base station by user equipment succeeds according to an embodiment of the disclosure.
Figure 7:
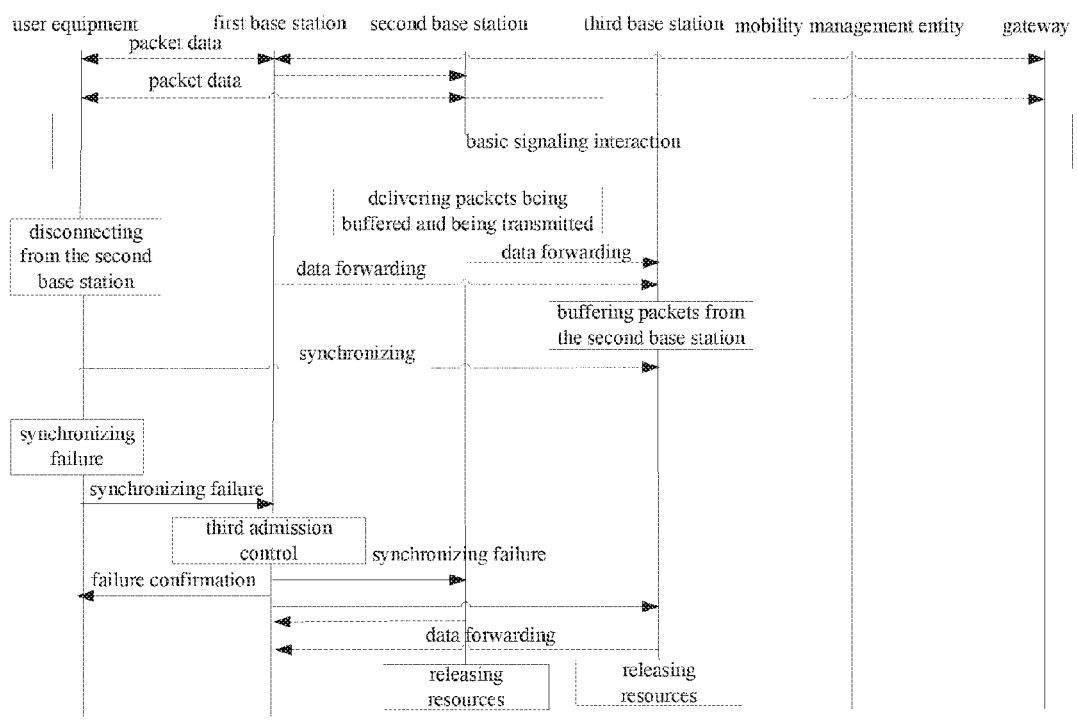
FIG. 7 is a schematic diagram illustrating an exemplary scene in a case that data of a second base station is forwarded via a first base station and synchronized access to a third base station by user equipment fails according to an embodiment of the disclosure.

Next, exemplary scenes in a case that the data of the second base station 104 is forwarded via the first base station 102 will be described with reference to FIGS. 6A, 6B, 6C and 7. FIG. 6A is a schematic diagram illustrating an exemplary scene in a case that the data of the second base station and the third base station is forwarded via the first base station and the synchronized access to the third base station by the user equipment succeeds according to an embodiment of the disclosure; FIG. 6B is a schematic diagram illustrating another exemplary scene in a case that the data of the second base station and the third base station is forwarded via the first base station and the synchronized access to the third base station by the user equipment succeeds according to an embodiment of the disclosure; FIG. 6C is a schematic diagram illustrating an exemplary scene in a case that the data of the second base station is forwarded via the first base station while the data of the third base station is directly routed from the core network after completing triggering of the transfer procedure and the synchronized access to the third base station by the user equipment succeeds according to an embodiment of the disclosure; and FIG. 7 is a schematic diagram illustrating an exemplary scene in a case that the data of the second base station is forwarded via the first base station and the synchronized access to the third base station by the user equipment fails according to an embodiment of the disclosure.

Specifically, if the data of the second base station 104 and the third base station 106 is forwarded from the first base station 102, the first base station 102 stops forwarding data to the second base station 104 after completing confirmation for the first admission control or completing the second admission control, and the second base station 104 performs data forwarding operation according to the result of the first admission control to forward the data of the first radio bearer acceptable by the third base station 106 to the third base station 106 and also performs data forwarding operation according to the result of the second admission control to forward the data of the second radio bearer acceptable by the first base station 102 to the first base station 102.

At this time, the data of the second base station 104 is forwarded from the first base station 102, and thus the first base station 102 also needs to perform data forwarding operation for the third base station 106, and the first base station 102 may perform, after completing confirmation for the first admission control, the data forwarding operation simultaneously with the second base station 104 so as to forward the data of the first radio bearer to the third base station 106 regardless of success or failure of the synchronized access between the user equipment 108 and the third base station 106, as shown in FIG. 6A. Alternatively, the first base station 102 may also perform data forwarding operation only after acquiring the success of the synchronized access between the user equipment 108 and the third base station 106, as shown in FIG. 6B, which is more suitable for a situation in which the first base station 102 and the second base station 104 transmit services for one same radio bearer at the same time.

Further, the second base station 104 automatically releases resources related to the services of the user equipment 108 after completing the data forwarding operation.

Particularly, if the result of the first admission control indicates that the third base station 106 can not accept all the radio bearers, while the data forwarding operation for the first radio bearer accepted by the third base station 106 is performed, in addition to stopping forwarding data to the second base station 104 by the first base station 102, the second base station 104 also needs to transfer the data of the second radio bearer accepted by the first base station 102 back to the first base station 102 for transmission.

Alternatively, as shown in FIG. 6C, if the data of the second base station 104 is forwarded from the first base station 102 while the data of the third base station 106 is directly routed from the core network after completing triggering of the transfer procedure, in a case that the synchronized access to the third base station 106 by the user equipment 108 succeeds, in addition to the processing procedures described above with reference to FIGS. 6A and 6B, operations at the core network end are also involved, that is, the third base station 106 needs to notify the core network to modify the core network bearer corresponding to the first radio bearer acceptable by the third base station 106. Specifically, after the synchronized access to the third base station 106 by the user equipment 108 succeeds, the third base station 106 further sends "path switch request" for example to the mobility management entity, the mobility management entity sends, after receiving the request, "bearer modifying request" for example to the gateway, and the gateway performs switching downlink path operation after receiving the request and thus the data of the first radio bearer acceptable by the third base station 106 is directly routed to the third base station 106, and the gateway sends an end flag to the first base station 102 to inform the number of the last data packet forwarded to the third base station 106 via the first base station. Thereafter, the gateway sends "bearer modifying response" for example to the mobility management entity, and the mobility management entity sends, after receiving the response, "path switch confirmation" for example as confirmation for the "path switch request" to the third base station 106, thereby notifying the third base station 106 of completion of the path switch operation at the core network end.

However, if the synchronized access to the third base station 106 by the user equipment 108 fails, as shown in FIG. 7, similar to the scene described with reference to FIG. 5, the user equipment 108 first notifies the first base station 102, the first base station 102 stops forwarding data to the third base station 106 after receiving the notification, and the first base station 102 notifies the second base station 104 and the third base station 106 after performing the third admission control to notify the failure of the synchronized access and cause the second base station 104 and the third base station 106 to perform data forwarding operation for the third radio bearer acceptable by the first base station 102 in the first radio bearer, so that the data of the third radio bearer acceptable by the first base station 102 in the first radio bearer is forwarded to the first base station 102 and the radio bearer unacceptable by the first base station 102 in the first radio bearer is released. Meanwhile, the first base station 102 notifies the user equipment 108 of which data can be transmitted over carriers of the first base station 102 and which data needs to be released.

As can be seen from above description with reference to FIGS. 6A, 6B and 7, under these scenes, the first base station 102 is responsible for forwarding data to other base stations in the wireless communication system, and thus, no path switch operation at the core network end will be involved in both cases of success and failure of the synchronized access operation.

Further, it is to be noted that although FIG. 7 shows that the first base station 102 and the second base station 104 performs data forwarding operation for the third base station 106 at the same time, but this is merely an example, and similar to FIG. 6B, the first base station 102 may also not perform data forwarding operation for the third base station 106 at first, which is not limited herein.

Figure 8:
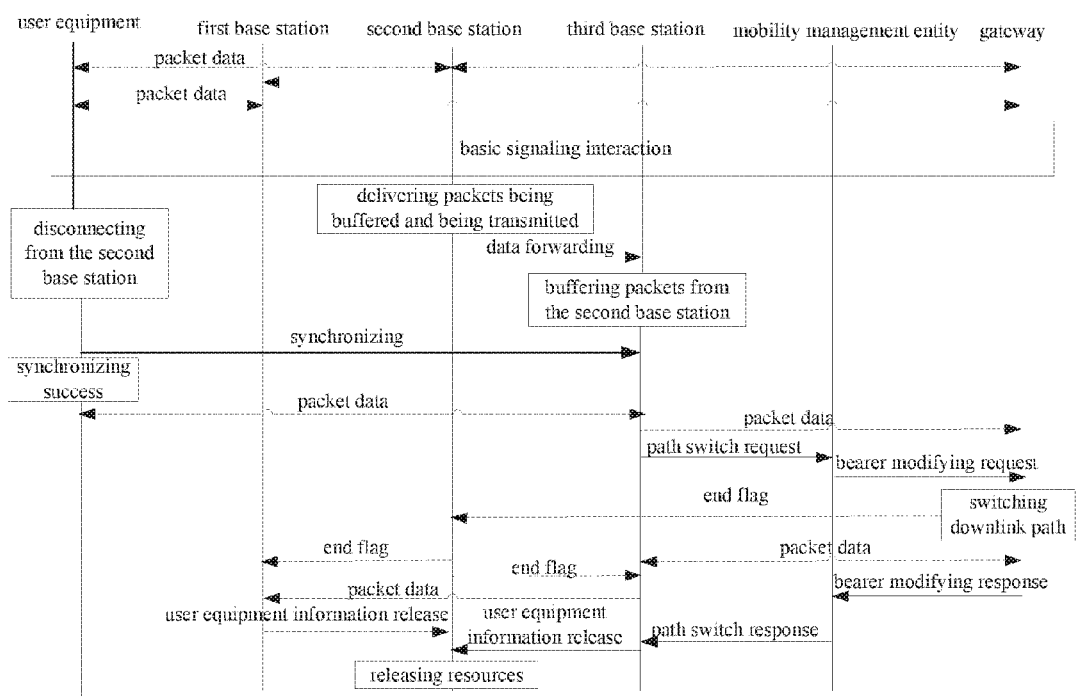
FIG. 8 is a schematic diagram illustrating an exemplary scene in a case that data of a first base station is forwarded via a second base station and synchronized access to a third base station by user equipment succeeds according to an embodiment of the disclosure.
Figure 9:
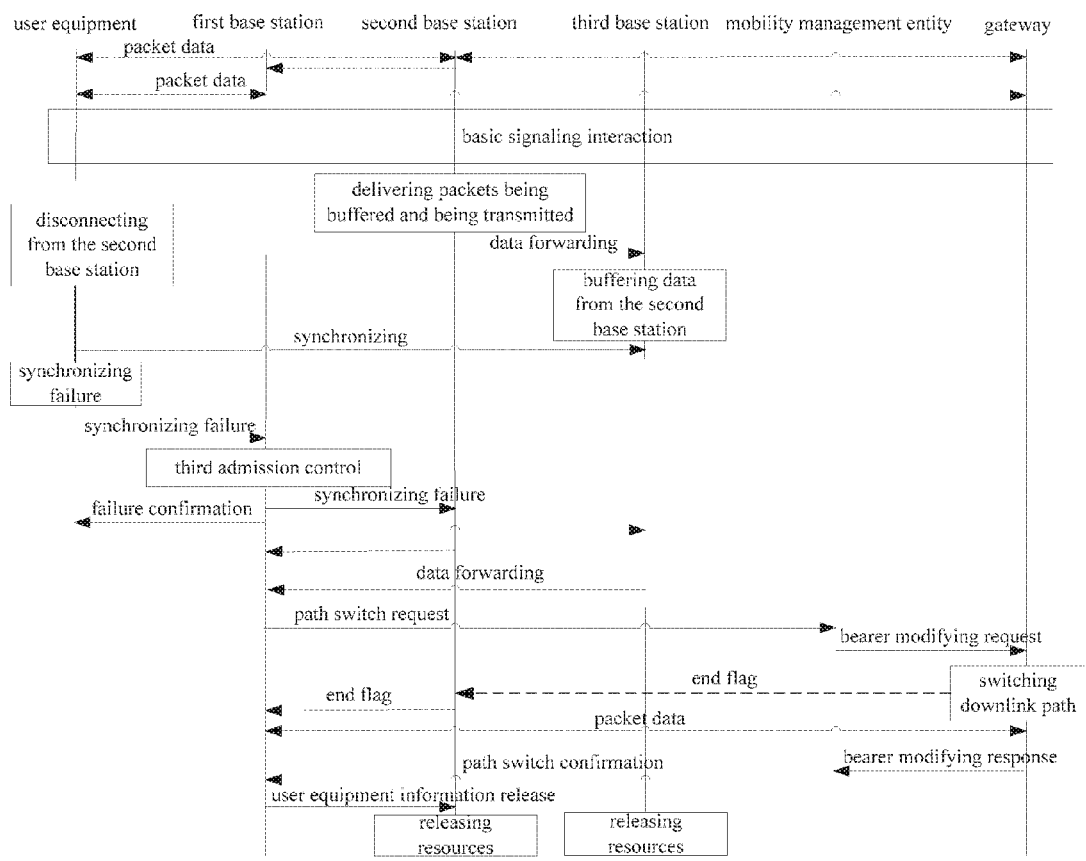
FIG. 9 is a schematic diagram illustrating an exemplary scene in a case that data of a first base station is forwarded via a second base station and synchronized access to a third base station by user equipment fails according to an embodiment of the disclosure.

Exemplary scenes in a case that the data of the first base station is forwarded via the second base station will be described with reference to FIGS. 8 and 9 below. FIG. 8 is a schematic diagram illustrating an exemplary scene in a case that the data of the first base station is forwarded via the second base station and the synchronized access to the third base station by the user equipment succeeds according to an embodiment of the disclosure; and FIG. 9 is a schematic diagram illustrating an exemplary scene in a case that the data of the first base station is forwarded via the second base station and the synchronized access to the third base station by the user equipment fails according to an embodiment of the disclosure.

Specifically, if the data of the first base station 102 is forwarded via the second base station 104, the second base station 104 performs data forwarding operation according to the result of the first admission control to forward the data of the first radio bearer acceptable by the third base station 106 to the third base station 106, and performs data forwarding operation according to the result of the second admission control to forward the data of the second radio bearer acceptable by the first base station 102 to the first base station 102.

If the synchronized access to the third base station 106 by the user equipment 108 succeeds, as shown in FIG. 8, the third base station 106 triggers the core network to perform path switch to route the data sent from the core network to the second base station 104 directly to the third base station 106, and after completing the path switch, the third base station 106 starts forwarding the data of downlink bearer transmitted via the first base station 102 to the first base station 102, and the second base station 104 releases information related to the user equipment and services thereof after completing the data forwarding operation. Specifically, after succeeding in the synchronized access, the third base station 106 sends "path switch request" for example to the mobility management entity, the mobility management entity sends, after receiving the request, "bearer modifying request" for example to the gateway, and the gateway performs switching downlink path operation after receiving the request and thus the data of the first radio bearer acceptable by the third base station 106 is directly routed to the third base station 106, and the gateway sends an end flag to the second base station 104. Then, the second base station 104 forwards this end flag to the first base station 102 to inform the first base station of the number of last data packet forwarded via the second base station 104. Thereafter, the gateway sends "bearer modifying response" for example to the mobility management entity, and the mobility management entity sends "path switch confirmation" for example as confirmation for the "path switch request" to the third base station 106 after receiving the response, and thus notifies the third base station 106 that the path switch operation at the core network end has been completed.

As can be seen from FIG. 8, in a case that the synchronized access succeeds, after receiving the end flag for the services transmitted by the first base station 102, the second base station 104 forwards the flag to the first base station 102, and then releases all resources related to the user equipment 108 after receiving a message "user equipment information release" sent by the third base station 106 and/or the first base station 102.

Otherwise, if the synchronized access to the third base station 106 by the user equipment 108 fails, then as shown in FIG. 9, the user equipment 108 notifies the first base station 102, and the first base station 102 notifies the second base station 104 and the third base station 106 after performing the third admission control to notify the failure of the synchronized access and cause the second base station 104 and the third base station 106 perform data forwarding operation for the third radio bearer acceptable by the first base station 102 in the first radio bearer, and meanwhile notifies the user equipment 108 of which data can be transmitted over carriers of the first base station 102 and which data needs to be released.

Preferably, in the case that the synchronized access fails, the data of the services transmitted by the first base station 102 (that is, data of the original services of the first base station 102, data of the second radio bearer and data of the third radio bearer) may also be forwarded to the first base station 102 via the second base station 104. In this case, when switching needs to be performed among small base stations, there always exists one anchor base station (for example, the second base station 104 herein) being responsible for data forwarding, and thus it only needs to notify the anchor base station of the transfer the data forwarding.

However, alternatively, it is also possible that after completing the third admission control by the first base station 102, the first base station 102 or the second base station 104 notifies the core network to perform path switch for the data of all the radio bearers accepted by the first base station 102, so that the path corresponding to the data forwarded to the first base station 102 via the second base station 104 is switched to the first base station 102 and the core network bearer corresponding to the radio bearer unacceptable by the first base station 102 in the first radio bearer is released, and meanwhile notifies the user equipment 108 to release the radio bearer unacceptable by the first base station 102 in the first radio bearer.

It is to be noted that in the case that the synchronized access fails, as shown in FIG. 9, except that the mobility management entity is notified by the first base station 102 or the second base station 104 at this time, specific path switch operations involving the core network are similar to those described above with reference to FIG. 8, and thus no repeated description will be made herein.

Although data forwarding and path switch operations after the transfer procedure in various situations have been described above with reference to FIGS. 4-9, it should be understood that the drawings and related description thereof are only examples but not limitation, and those skilled in the art may modify the above procedures according to the principle of the invention. For example, although in the above the first base station 102 and the third base station 106 together undertake at least part of the services originally provided by the second base station 104, it is also possible that the third base station 106 undertakes this individually, while for the services unacceptable by the third base station 106, the user equipment 108 is notified to release this part of the services. Further, although it only shows the second base station 104 performs data forwarding operation to the third base station 106 in FIGS. 4-9, this is merely for the purpose of clarity of illustration but not limitation, it should be understood that in a case that the first base station 102 performs admission control, the second base station 104 also performs data forwarding operation to the first base station 102 with respect to the radio bearer accepted by the first base station 102.

Further, it should be noted that for the purpose of clarity, only signaling interactions closely related to the disclosure are shown in the drawings, and for other well-known signaling interactions in the art, no detailed description will be made herein.

As can be understood from the above detailed description of the embodiments of the disclosure, by performing the above transfer procedure in the case that the predetermined transfer condition is satisfied, it is possible to ensure the user equipment obtains optimized service quality while improving data transmission efficiency.

Figure 10:
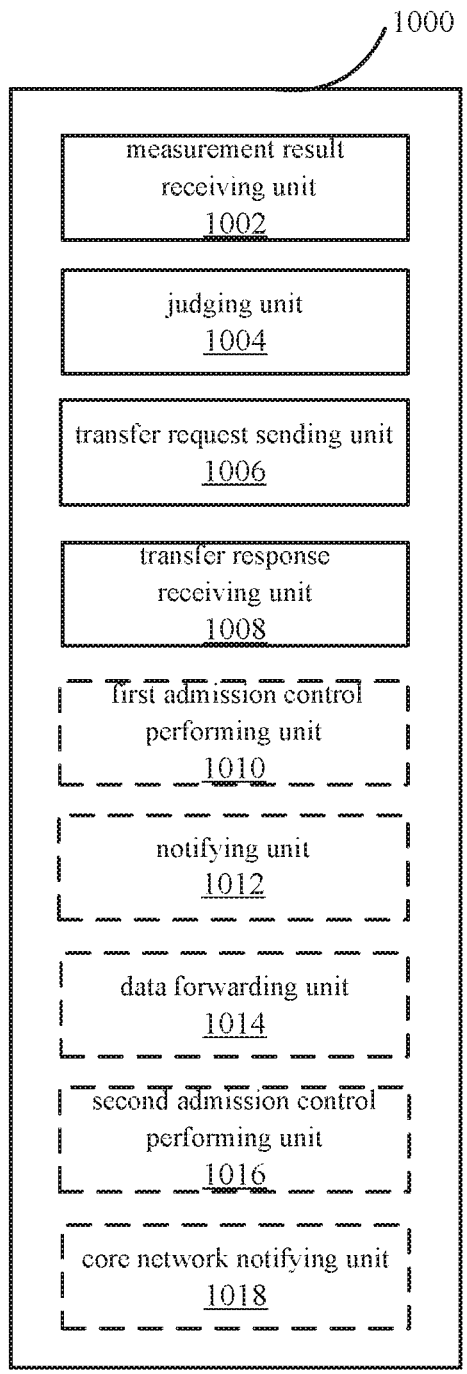
FIG. 10 is a block diagram illustrating an example of functional configuration of a first base station serving as a connection maintaining node according to an embodiment of the disclosure.

An example of functional configuration of a first base station serving as the connection maintaining node according to an embodiment of the disclosure will be described with reference to FIG. 10 below. FIG. 10 is a block diagram illustrating an example of functional configuration of a first base station serving as the connection maintaining node according to an embodiment of the disclosure.

As shown in FIG. 10, the first base station 1000 according to the present embodiment may include a measurement result receiving unit 1002, a judging unit 1004, a transfer request sending unit 1006 and a transfer response receiving unit 1008. Examples of functional configurations of respective units will be described in detail below.

The measurement result receiving unit 1002 may be configured to receive, in a case that the first base station 1000 is the triggering node to trigger the above transfer procedure, a mobility measurement result regarding the serving carrier between the user equipment and the second base station from the user equipment or the second base station as the connection transfer source node.

The judging unit 1004 may be configured to judge whether the predetermined transfer condition of transferring the services provided to the user equipment by the second base station to the third base station is satisfied based on the mobility measurement result received by the measurement result receiving unit 1002.

The transfer request sending unit 1006 may be configured to send a transfer request to the third base station as the connection transfer target node in a case that the judging unit 1004 judges the predetermined transfer condition is satisfied, so as to trigger the user equipment to release the wireless data connection with the second base station and establish the wireless data connection with the third base station, and thus the first base station and the third base station perform wireless data connection with the user equipment over different carriers. Particularly, at least part of the services originally provided by the second base station is transferred to the third base station.

The transfer response receiving unit 1008 may be configured to receive from the third base station the transfer response which may include the result of the admission control performed by the third base station.

Preferably, the first base station 1000 may further include a first admission control performing unit 1010. The first admission control performing unit 1010 may be configured to perform, in a case that the admission control result contained in the transfer response received by the transfer response receiving unit 1008 indicates that the third base station can not accept all radio bearers of the second base station, admission control for radio bearer unacceptable by the third base station, so that the radio bearer acceptable by the first bases station can be transferred to the first base station 1000.

Also, optionally, the first base station 1000 may further include a notifying unit 1012. The notifying unit 1012 may be configured to notify the result of the admission control performed by the third base station and optionally the result of the admission control performed by the first base station to the user equipment and/or the second base station.

Further, optionally, the first base station 1000 may further include a data forwarding unit 1014. The data forwarding unit 1014 may be configured to perform data forwarding to the third base station in a case that the data of the second base station is forwarded via the first base station. Preferably, the data forwarding unit 1014 may perform data forwarding simultaneously with the second base station after completing the basic signaling interaction of the transfer procedure, or may perform the data forwarding only after receiving a message that the synchronized access between the user equipment and the third base station succeeds.

Preferably, the first base station 1000 may further include a second admission control performing unit 1016. The second admission control performing unit 1016 may be configured to perform, in a case that the synchronized access between the user equipment and the third base station fails, admission control for the radio bearer that should be accepted by the third base station originally, so that the radio bearer acceptable by the first base station is transferred to the first base station 1000.

Further, preferably, the first base station 1000 may further include a core network notifying unit 1018. The core network notifying unit 1018 may be configured to notify the core network to switch the path corresponding to the radio bearer accepted by the first base station to the first base station in a case that the data of the second base station comes directly from the core network.

It is to be understood that all of the first admission control performing unit 1010, the notifying unit 1012, the data forwarding unit 1014, the second admission control performing unit 1016 and the core network notifying unit 1018 are optional, which are shown in broken-line blocks in FIG. 10, and those skilled in the art may combine one or more of the above described units as required for example, and any such combinations are considered to fall within the scope of the disclosure.

Figure 11:
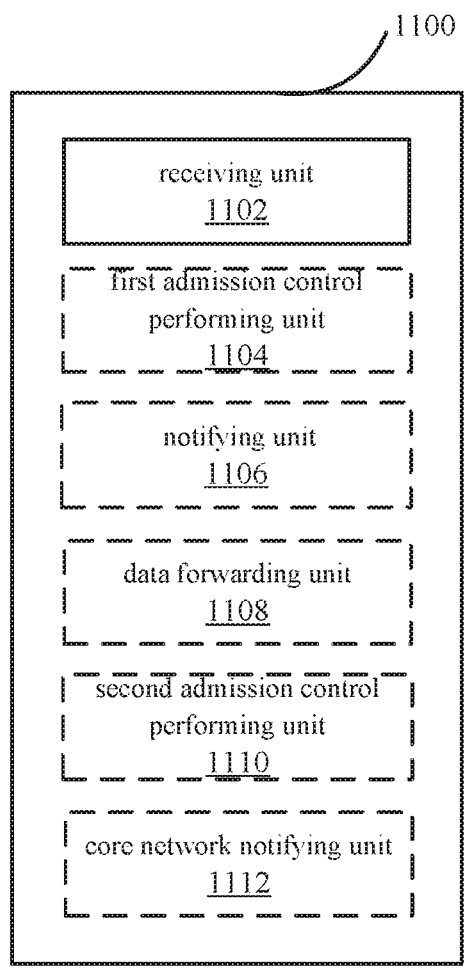
FIG. 11 is a block diagram illustrating an example of functional configuration of a first base station serving as a connection maintaining node according to another embodiment of the disclosure.

Next, an example of functional configuration of the first base station serving as the connection maintaining node according to another embodiment of the disclosure will be described with reference to FIG. 11. FIG. 11 is a block diagram illustrating an example of functional configuration of the first base station serving as the connection maintaining node according to another embodiment of the disclosure. Except for providing a receiving unit 1102 instead of the measurement result receiving unit 1002, the transfer request sending unit 1004, the judging unit 1006 and the transfer response receiving unit 1008, the functional configuration of the first base station 1100 as shown in FIG. 11 is the same as that of the first base station 1000 described above with reference to FIG. 10, and thus some description will be omitted as appropriate.

The receiving unit 1102 may be configured to receive a notification regarding the transfer procedure from the second base station or the third base station serving as the connection transfer target node in a case that the above transfer procedure is triggered by the second base station serving as the connection transfer source node, and the notification may include the result of the admission control performed by the third base station.

Further, for the optional first admission control performing unit 1104, the notifying unit 1106, the data forwarding unit 1108, the second admission control performing unit 1110 and the core network notifying unit 1112 as shown in broken-line blocks in FIG. 11, functional configurations thereof are the same as those of corresponding units described above with reference to FIG. 10, and no repeated description will be made herein.

Figure 12:
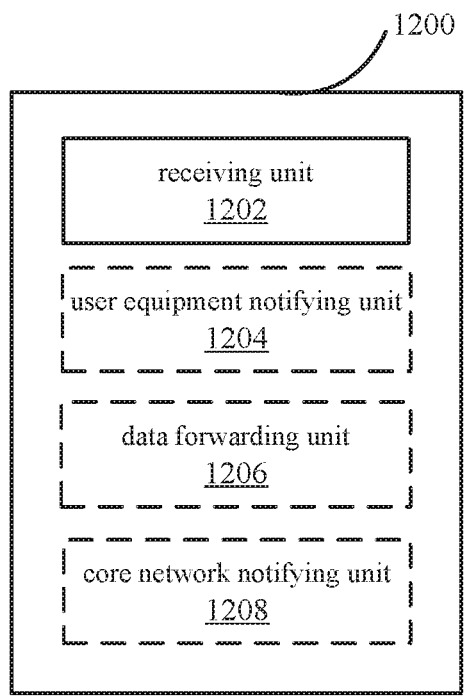
FIG. 12 is a block diagram illustrating an example of functional configuration of a second base station serving as a connection transfer source node according to an embodiment of the disclosure.

Next, an example of functional configuration of the second base station serving as the connection transfer source node according to an embodiment of the disclosure will be described with reference to FIG. 12. FIG. 12 is a block diagram illustrating an example of functional configuration of the second base station serving as the connection transfer source node according to an embodiment of the disclosure.

As shown in FIG. 12, the second base station 1200 according to the embodiment of the disclosure may include a receiving unit 1202. The receiving unit 1202 may be configured to receive a notification regarding the transfer procedure from the first base station or the third base station serving as the connection transfer target node in a case that the transfer procedure is triggered by the first base station serving as the connection maintaining node, and the notification may include the result of the admission control performed by the third base station and optionally the result of the admission control performed by the first base station.

Optionally, the second base station 1200 may further include a user equipment notifying unit 1204. The user equipment notifying unit 1204 may be configured to notify the user equipment of the result of the admission control performed by the third base station and optionally the result of the admission control performed by the first base station.

Optionally, the second base station 1200 may further include a data forwarding unit 1206. The data forwarding unit 1206 may be configured to perform data forwarding operation to the third base station and optionally the first base station, so as to forward the data of the radio bearers acceptable by the third base station and the first base station to the third base station and the first base station respectively.

Optionally, the second base station 1200 may further include a core network notifying unit 1208. The core network notifying unit 1208 may be configured to notify the core network to switch the path corresponding to the radio bearer acceptable by the first base station to the first base station in a case that the data of the second base station directly comes from the core network.

Figure 13:
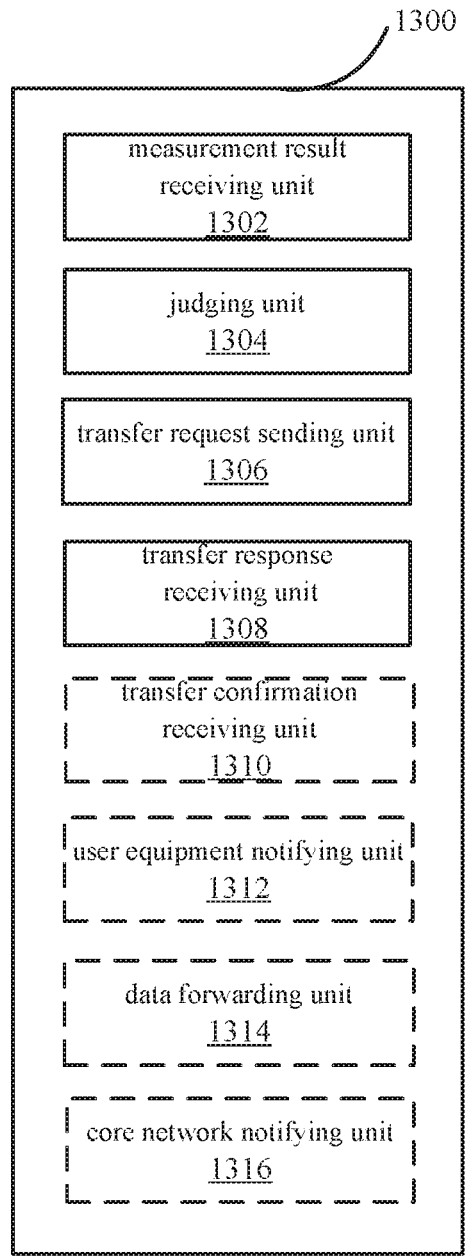
FIG. 13 is a block diagram illustrating an example of functional configuration of a second base station serving as a connection transfer source node according to another embodiment of the disclosure.

Next, an example of the functional configuration of the second base station serving as the connection transfer source node according to another embodiment of the disclosure will be described with reference to FIG. 13. FIG. 13 is a block diagram illustrating an example of the functional configuration of the second base station serving as the connection transfer source node according to another embodiment of the disclosure. Except for providing a measurement result receiving unit 1302, a judging unit 1304, a transfer request sending unit 1306 and a transfer response receiving unit 1308 instead of the receiving unit 1202 of the second base station 1200 as shown in FIG. 12, the functional configuration of the second base station 1300 as shown in FIG. 13 is the same as that of the second base station 1200 as shown in FIG. 12, and thus description thereof will be omitted as appropriate.

The measurement result receiving unit 1302 may be configured to receive a mobility measurement result regarding a serving carrier between the user equipment and the second base station from the user equipment.

The judging unit 1304 may be configured to judge whether a predetermined transfer condition of transferring the services provided to the user equipment by the second base station to the third base station is satisfied according to the mobility measurement result received by the measurement result receiving unit 1302.

The transfer request sending unit 1306 may be configured to send a transfer request to the third base station serving as the connection transfer target node in a case that the judging unit 1304 judges the predetermined transfer condition is satisfied, so as to trigger the user equipment to release the wireless data connection with the second base station and establish the wireless data connection with the third base station, and thus the first base station serving as the connection maintaining node and the third base station perform wireless data connection with the user equipment over different carriers, so that at least part of the services originally provided by the second base station is transferred to the third base station.

The transfer response receiving unit 1308 may be configured to receive from the third base station a transfer response which may include the result of the admission control performed by the third base station.

Further, preferably, the third base station 1300 may further include a transfer confirmation receiving unit 1310. The transfer confirmation receiving unit 1310 may be configured to receive from the first base station a transfer confirmation which may include the result of the admission control performed by the first base station.

Further, for a user equipment notifying unit 1312, a data forwarding unit 1314 and a core network notifying unit 1316 as shown in broken-line blocks in FIG. 13, functional configurations thereof are the same as those of the user equipment notifying unit 1204, the data forwarding unit 1206 and the core network notifying unit 1208 described above with reference to FIG. 12, and no repeated description will be made herein.

Further, it is to be noted that similar to the cases as shown in FIGS. 10 and 11, the constitute units as shown in broken-line blocks in FIGS. 12 and 13 are optional, and those skilled in the art may combine one or more of these units according to actual requirements, and any such combinations are considered to fall within the scope of the disclosure.

Figure 14:
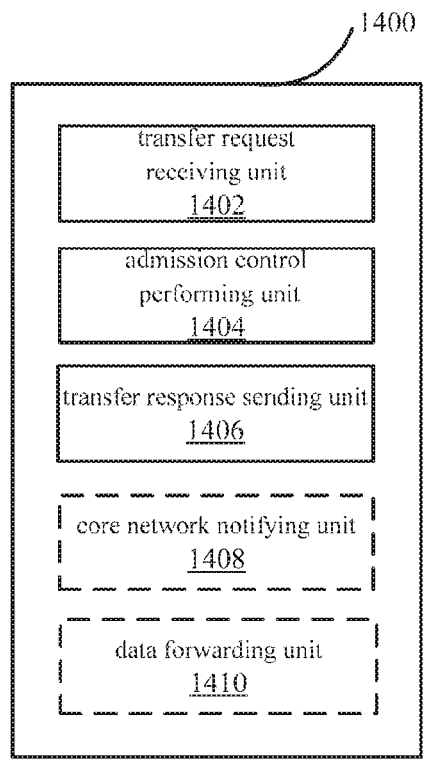
FIG. 14 is a block diagram illustrating an example of functional configuration of a third base station serving as a connection transfer target node according to an embodiment of the disclosure.

Next, an example of functional configuration of the third base station serving as the connection transfer target node according to an embodiment of the disclosure will be described with reference to FIG. 14. FIG. 14 is a block diagram illustrating an example of functional configuration of the third base station serving as the connection transfer target node according to an embodiment of the disclosure.

As shown in FIG. 14, the third base station 1400 according to the embodiment of the disclosure may include a transfer request receiving unit 1402, an admission control performing unit 1404 and a transfer response sending unit 1406.

The transfer request receiving unit 1402 may be configured to receive a transfer request regarding the transfer procedure from the first base station serving as the connection maintaining node or the second base station serving as the connection transfer source node which is the triggering node to make the user equipment release the wireless data connection with the second base station, and in a case that the synchronized access between the user equipment and the third base station succeeds, the first base station and the third base station perform wireless data connection with the user equipment over different carriers so that at least part of the services originally provided by the second base station is transferred to the third base station.

The admission control performing unit 1404 may be configured to perform the admission control according to the transfer request received by the transfer request receiving unit 1402 so as to determine the radio bearer of the second base station acceptable by the third base station.

The transfer response sending unit 1406 may be configured to send a transfer response which may include the result of the admission control performed by the third base station to the first base station or the second base station which is the triggering node for the transfer procedure.

Optionally, the third base station 1400 may further include a core network notifying unit 1408. The core network notifying unit 1408 may be configured to notify the core network to switch the path corresponding to the radio bearer acceptable by the third base station to the third base station in a case that the data of the second base station directly comes from the core network or the data of the first base station is forwarded via the second base station and the synchronized access between the user equipment and the third base station succeeds.

Further, optionally, the third base station 1400 may further include a data forwarding unit 1410. The data forwarding unit 1410 may be configured to perform data forwarding to the first base station in a case that the synchronized access between the user equipment and the third base station fails, so as to forward the data of the radio bearer acceptable by the first base station in the radio bearer originally accepted by the third base station to the first base station.

It is to be understood that both of the core network notifying unit 1408 and the data forwarding unit 1410 as shown in broken-line blocks in FIG. 14 are optional, and those skilled in the art may combine one or more of these units according to actual requirements and any such combinations are considered to fall within the scope of the disclosure.

Figure 15:
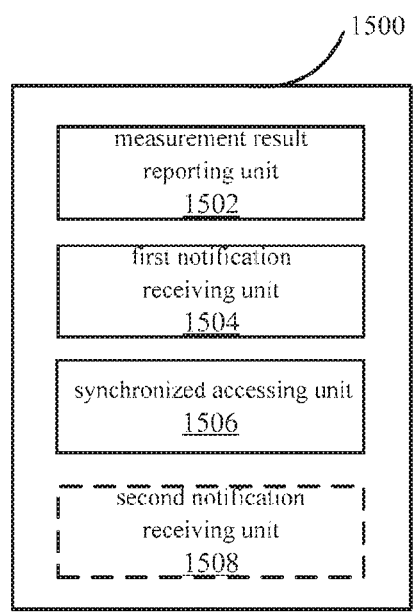
FIG. 15 is a block diagram illustrating an example of functional configuration of user equipment according to an embodiment of the disclosure.

Next, an example of functional configuration of the user equipment according to an embodiment of the disclosure will be described with reference to FIG. 15. FIG. 15 is a block diagram illustrating an example of functional configuration of the user equipment according to an embodiment of the disclosure.

As shown in FIG. 15, the user equipment 1500 according to the embodiment of the disclosure may include a measurement result reporting unit 1502, a first notification receiving unit 1504 and a synchronized accessing unit 1506.

The measurement result reporting unit 1502 may be configured to report a mobility measurement result regarding a serving carrier between the user equipment and the second base station serving as the connection transfer source node to the second base station and optionally the first base station serving as the connection maintaining node, so as to serve as reference for the triggering node to judge whether the predetermined transfer condition of transferring the services provided to the user equipment by the second base station to the third base station is satisfied.

The first notification receiving unit 1504 may be configured to receive a notification regarding the transfer procedure from the first base station or the second base station, and the notification may include the result of the admission control performed by the third base station serving as the connection transfer target node and optionally the result of the admission control performed by the first base station.

The synchronized accessing unit 1506 may be configured to perform the synchronized access to the third base station according to the notification received by the first notification receiving unit 1504.

Preferably, the user equipment 1500 may further include a second notification receiving unit 1508. The second notification receiving unit 1508 may be configured to receive a notification from the first base station in a case that the synchronized access to the third base station by the user equipment fails, the notification including information about which data of the user equipment may be transmitted over the carrier of the first base station and which data needs to be released.

Similarly, the second notification receiving unit 1508 as shown in broken-line block in FIG. 15 is also optional.

It is to be noted that although the examples of the functional configurations of the first base station, the second base station, the third base station and the user equipment in the wireless communication system according to the embodiments of the disclosure have been described above with reference to FIGS. 10-15, it should be understood that this constructs no limitation on the disclosure, and those skilled in the art may combine, sub-combine and alter the above configurations according to the principle of the disclosure.

Figure 16:
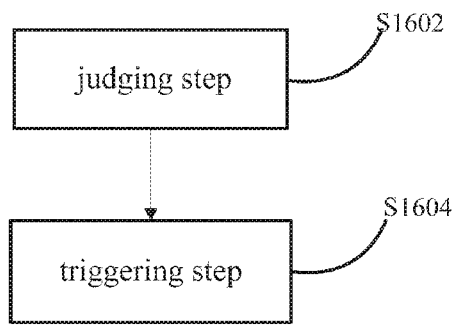
FIG. 16 is a flow chart illustrating an example of a procedure of a method used in the wireless communication system according to an embodiment of the disclosure.

Next, an example of a procedure of a method used in the wireless communication system according to an embodiment of the disclosure will be described with reference to FIG. 16. FIG. 16 is a flow chart illustrating an example of a procedure of a method used in the wireless communication system according to an embodiment of the disclosure. The wireless communication system may include a first base station, a second base station, a third base station and user equipment, and the first base station and the second base station perform wireless data connection with the user equipment over different carriers.

As shown in FIG. 16, the method 1600 according to the embodiment of the disclosure may include a judging step S1602 and a triggering step S1604.

In the judging step S1602, whether the predetermined transfer condition of transferring the services provided to the user equipment by the second base station to the third base station is satisfied may be judged by the triggering node. The triggering node may be the first base station serving as the connection maintaining node or the second base station serving as the connection transfer source node.

Next, in the triggering step S1604, the transfer procedure may be triggered in a case that it is judged the predetermined transfer condition is satisfied, so as to make the user equipment release the wireless data connection with the second base station and establish the wireless data connection with the third base station, and thus the first base station and the third base station perform wireless data connection with the user equipment over different carriers. Particularly, at least part of the services originally provided by the second base station is transferred to the third base station.

Preferably, the above transfer procedure also causes part of the services originally provided by the second base station to be transferred to the first base station.

Further, preferably, the triggering node sends a transfer request to the third base station if it judges the predetermined transfer condition is satisfied according to a received mobility measurement result regarding a serving carrier of the second base station, and the third base station performs the first admission control according to the transfer request and sends a transfer response to the triggering node to notify the result of the first admission control.

Further, preferably, if the result of the first admission control indicates that the third base station can not accept all radio bearers between the user equipment and the second base station, the first base station performs the second admission control according to the result of the first admission control and notifies the second base station of the result of the second admission control.

Further, preferably, the first base station or the second base station sends, after acquiring the final result of the first admission control or the second admission control, a notification message to the user equipment to notify the user equipment to perform the transfer procedure according to the final result and the transfer response of the third base station, the notification message including at least one of the following: for which part of the radio bearer of the user equipment that the first base station can perform communication, for which part of the radio bearer of the user equipment that the third base station can perform communication, a dedicated preamble code as required when making synchronized access to the third base station, system information of a carrier for communication between the user equipment and the third base station, and configuration information of a control plane protocol for establishing communication between the user equipment and the third base station. Further, the user equipment releases, after receiving the notification message, the radio bearers unacceptable by the first base station and the third base station, and releases the wireless data connection with the second base station and performs synchronized access to the third base station at the same time.

It is to be understood that the method used in the wireless communication system according to the embodiment of the disclosure corresponds to the embodiments of the wireless communication system described above, and thus parts which are not described in detail herein may be referred to the foregoing description at previous corresponding positions, and no repeated description will be made herein.

Further, the embodiment of the disclosure also provides a storage medium including machine readable program codes which when executed on an information processing apparatus, cause the information processing apparatus to perform the method used in the wireless communication system according to the embodiment of the disclosure as described above, the method including the following steps: a judging step of judging, by a triggering node, whether a predetermined transfer condition for transferring services provided to user equipment by a second base station to a third base station is satisfied; and a triggering step of triggering the transfer procedure if it is judged that the predetermined transfer condition is satisfied, so that the user equipment releases wireless data connection with the second base station and establishes wireless data connection with the third base station, and thus a first base station and the third base station perform wireless data connection with the user equipment over different carriers, wherein at least part of the services originally provided by the second base station is transferred to the third base station. Particularly, the first base station, the second base station, the third base station and the user equipment are included in a wireless communication system, and the first base station and the second base station perform wireless data connection with the user equipment over different carriers.

Further, the embodiment of the disclosure also provides a program product including machine executable instructions which when executed on an information processing apparatus cause the information processing apparatus to perform the method used in the wireless communication system according to the embodiment of the disclosure as described above, the method including the following steps: a judging step of judging, by a triggering node, whether a predetermined transfer condition for transferring services provided to user equipment by a second base station to a third base station is satisfied; and a triggering step of triggering the transfer procedure if it is judged that the predetermined transfer condition is satisfied, so that the user equipment releases wireless data connection with the second base station and establishes wireless data connection with the third base station, and thus a first base station and the third base station perform wireless data connection with the user equipment over different carriers, wherein at least part of the services originally provided by the second base station is transferred to the third base station. Particularly, the first base station, the second base station, the third base station and the user equipment are included in a wireless communication system, and the first base station and the second base station perform wireless data connection with the user equipment over different carriers.

It should be appreciated that the machine executable instructions in the storage medium and the program product according to the embodiments of the disclosure may also be configured to perform the methods corresponding to the embodiments of the wireless communication system described above, and thus parts which are not described in detail herein may be referred to description at previous corresponding positions, and no repeated description will be made herein.

Accordingly, a storage medium on which the above program product storing machine readable instruction codes is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1700 illustrated in FIG. 17, which can perform various functions when various programs are installed thereon.

Figure 17:
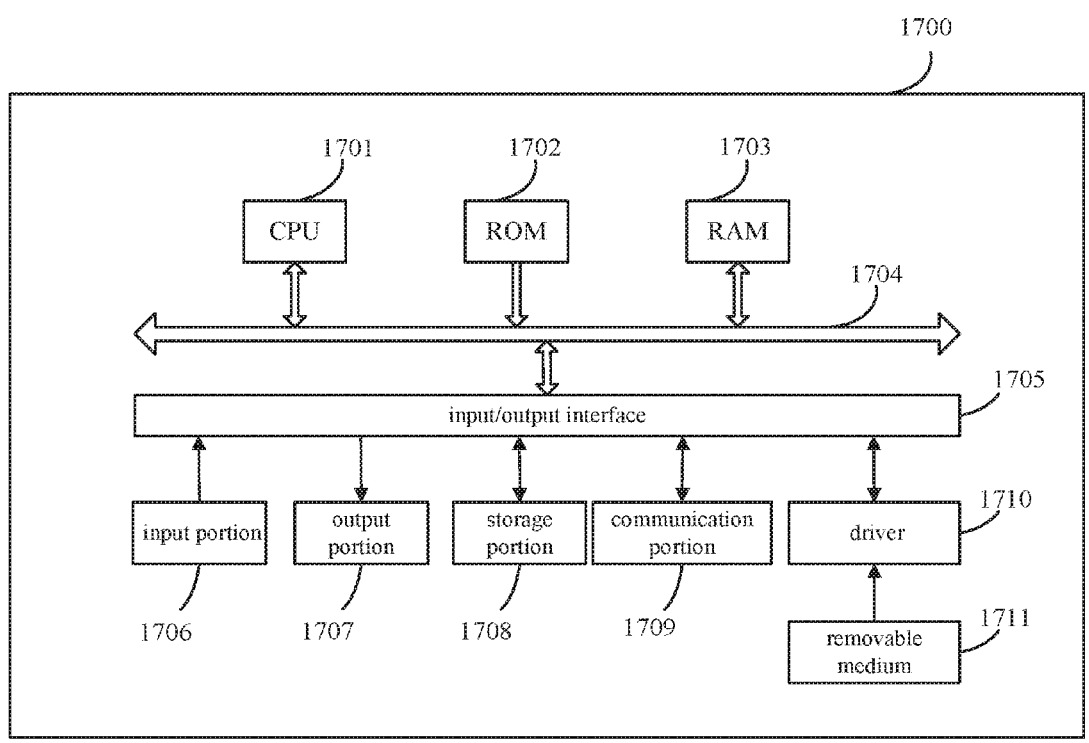
FIG. 17 is a block diagram illustrating an exemplary structure of a personal computer as an information processing apparatus that may be used in an embodiment of the disclosure.

In FIG. 17, a Central Processing Unit (CPU) 1701 performs various processes according to a program stored in a Read Only Memory (ROM) 1702 or loaded from a storage portion 1708 into a Random Access Memory (RAM) 1703 in which data required when the CPU 1701 performs the various processes is also stored as needed.

The CPU 1701, the ROM 1702 and the RAM 1703 are connected to each other via a bus 1704 to which an input/output interface 1705 is also connected.

The following components are connected to the input/output interface 1705: an input portion 1706 including a keyboard, a mouse, etc.; an output portion 1707 including a display, e.g., a Cathode Ray Tube (CRT), a Liquid Crystal Display (LCD), etc., a speaker, etc.; a storage portion 1708 including a hard disk, etc.; and a communication portion 1709 including a network interface card, e.g., an LAN card, a modem, etc. The communication portion 1709 performs a communication process over a network, e.g., the Internet.

A driver 1710 is also connected to the input/output interface 1705 as needed. A removable medium 1711, e.g., a magnetic disk, an optical disk, an magneto optical disk, a semiconductor memory, etc., can be installed on the driver 1710 as needed so that a computer program fetched therefrom can be installed into the storage portion 1808 as needed.

In the case that the foregoing series of processes are performed in software, a program constituting the software is installed from a network, e.g., the Internet, etc., or a storage medium, e.g., the removable medium 1711, etc.

Those skilled in the art shall appreciate that such a storage medium will not be limited to the removable medium 1711 illustrated in FIG. 17 in which the program is stored and which is distributed separately from the device to provide a user with the program. Examples of the removable medium 1711 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1702, a hard disk included in the storage portion 1708, etc., in which the program is stored and which is distributed together with the apparatus including the same to the user.

It shall further be noted that the steps of the foregoing series of processes may naturally but not necessarily be performed in the sequential order as described chronically. Some of the steps may be performed concurrently or separately from each other.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. An electronic device for an anchor node in a communication system comprising the anchor node, a source node, a target node and a user equipment,
   the electronic device comprising
   circuitry, configured to
   initiate a change procedure by requesting the target node to admit radio bearers of the user equipment in case that a predetermined condition of changing the source node which serves the user equipment together with the anchor node over different carriers to the target node is satisfied;

acquire an acknowledgment from the target node which includes a result of radio bearers admission; and indicate configuration information of the target node towards the user equipment for releasing the source node and accessing to the target node, wherein the anchor node is kept in connection with the user equipment to jointly serve the user equipment with the source node or the target node, wherein the circuitry is further configured to forward data of the user equipment to the target node.

2. The device according to claim 1, wherein the circuitry is further configured to indicate the source node of information in the result of radio bearers admission for data forwarding to the target node.

3. The device according to claim 1, wherein the circuitry is further configured to acquire data of the user equipment forwarded from the source node.

4. The device according to claim 1, wherein the configuration information of the target node comprising at least one of the following: which part of radio bearers of the user equipment that the anchor node admits, which part of the radio bearer of the user equipment that the target node admits, a dedicated preamble code as required for accessing to the target node, system information relating to the target node, and configuration information of a control plane protocol for establishing communication between the user equipment and the target node.

5. The device according to claim 1, wherein the anchor node corresponds to a base station.

6. An electronic device for a target node in a communication system comprising an anchor node, a source node, the target node and a user equipment, the electronic device comprising circuitry, configured to acquire a request from the anchor node which initiates a change procedure by requesting the target node to admit radio bearers of the user equipment in case that a predetermined condition of changing the source node which serves the user equipment together with the anchor node over different carriers to the target node is satisfied;

make an acknowledgment to the anchor node which includes a result of radio bearers admission; and receive access request from the user equipment based on configuration information of the target node to establish synchronization between the user equipment and the target node, wherein the anchor node is kept in connection with the user equipment to jointly serve the user equipment with the source node or the target node, wherein the circuitry is further configured to acquire data of the user equipment forwarded from the anchor node.

7. The device according to claim 6, wherein the configuration information of the target node comprising at least one of the following: which part of radio bearers of the user equipment that the anchor node admits, which part of the radio bearer of the user equipment that the target node admits, a dedicated preamble code as required for accessing to the target node, system information relating to the target node, and configuration information of a control plane protocol for establishing communication between the user equipment and the target node.

8. The device according to claim 6, wherein the target node corresponds to a small base station.

9. An electronic device for a source node in a communication system comprising an anchor node, the source node, a target node and a user equipment, the electronic device comprising circuitry, configured to release a connection between the user equipment and the source node which serves the user equipment together with the anchor node over different carriers in response to a change procedure initiated by the anchor node by requesting the target node to admit radio bearers of the user equipment in case that a predetermined condition of changing the source node to the target node is satisfied;

acquire an indication from the anchor node including information in a result of radio bearers admission of the target node; and forward data to at least one of the anchor node and the target node based on the indication, wherein the anchor node is kept in connection with the user equipment to jointly serve the user equipment with the source node or the target node.

10. An electronic device for a user equipment in a communication system comprising an anchor node, a source node, a target node and the user equipment, the electronic device comprising circuitry, configured to acquire configuration information of the target node from the anchor node in response to a change procedure which is initiated by the anchor node by requesting the target node to admit radio bearers of the user equipment in case that a predetermined condition of changing the source node which serves the user equipment together with the anchor node over different carriers to the target node is satisfied;

release the source node and access to the target node based on the configuration information; and receive data which is forwarded by the source node to at least one of the anchor node and the target node based on a result of radio bearers admission of the target node;

wherein the anchor node is kept in connection with the user equipment to jointly serve the user equipment with the source node or the target node.

11. The device according to claim 10, wherein the configuration information of the target node comprising at least one of the following:

which part of radio bearers of the user equipment that the anchor node admits, which part of the radio bearer of the user equipment that the target node admits, a dedicated preamble code as required for accessing to the target node, system information relating to the target node, and configuration information of a control plane protocol for establishing communication between the user equipment and the target node.

12. A communication method for an anchor node in a communication system comprising the anchor node, a source node, a target node and a user equipment, the method comprising initiating, using circuitry, a change procedure by requesting the target node to admit radio bearers of the user equipment in case that a predetermined condition of changing the source node which serves the user equipment together with the anchor node over different carriers to the target node is satisfied;

acquiring an acknowledgment from the target node which includes a result of radio bearers admission; and indicating configuration information of the target node towards the user equipment for releasing the source node and accessing to the target node, wherein the anchor node is kept in connection with the user equipment to jointly serve the user equipment with the source node or the target node, wherein the method further comprises forwarding data of the user equipment to the target node.

13. The method according to claim 12, wherein the method further comprises indicating the source node of information in the result of radio bearers admission for data forwarding to the target node.

14. The method according to claim 12, wherein the method further comprises acquiring data of the user equipment forwarded from the source node.

15. The method according to claim 12, wherein the configuration information of the target node comprising at least one of the following: which part of radio bearers of the user equipment that the anchor node admits, which part of the radio bearer of the user equipment that the target node admits, a dedicated preamble code as required for accessing to the target node, system information relating to the target node, and configuration information of a control plane protocol for establishing communication between the user equipment and the target node.

16. A communication method for a target node in a communication system comprising an anchor node, a source node, the target node and a user equipment, the method comprising acquiring, using circuitry, a request from the anchor node which initiates a change procedure by requesting the target node to admit radio bearers of the user equipment in case that a predetermined condition of changing the source node which serves the user equipment together with the anchor node over different carriers to the target node is satisfied;

making an acknowledgment to the anchor node which includes a result of radio bearers admission; and receiving access request from the user equipment based on configuration information of the target node to establish synchronization between the user equipment and the target node, wherein the anchor node is kept in connection with the user equipment to jointly serve the user equipment with the source node or the target node, wherein the method further comprises acquiring data of the user equipment forwarded from the anchor node.

17. The method according to claim 16, wherein the configuration information of the target node comprising at least one of the following: which part of radio bearers of the user equipment that the anchor node admits, which part of the radio bearer of the user equipment that the target node admits, a dedicated preamble code as required for accessing to the target node, system information relating to the target node, and configuration information of a control plane protocol for establishing communication between the user equipment and the target node.

18. A communication method for a source node in a communication system comprising an anchor node, the source node, a target node and a user equipment, the method comprising releasing, using circuitry, a connection between the user equipment and the source node which serves the user equipment together with the anchor node over different carriers in response to a change procedure initiated by the anchor node by requesting the target node to admit radio bearers of the user equipment in case that a predetermined condition of changing the source node to the target node is satisfied;

acquiring an indication from the anchor node including information in a result of radio bearers admission of the target node; and forwarding data to at least one of the anchor node and the target node based on the indication, wherein the anchor node is kept in connection with the user equipment to jointly serve the user equipment with the source node or the target node.

19. A communication method for a user equipment in a communication system comprising an anchor node, a source node, a target node and the user equipment, the method comprising acquiring, using circuitry, configuration information of the target node from the anchor node in response to a change procedure which is initiated by the anchor node by requesting the target node to admit radio bearers of the user equipment in case that a predetermined condition of changing the source node which serves the user equipment together with the anchor node over different carriers to the target node is satisfied;

releasing the source node and accessing to the target node based on the configuration information; and receiving data which is forwarded by the source node to at least one of the anchor node and the target node based on a result of radio bearers admission of the target node;

wherein the anchor node is kept in connection with the user equipment to jointly serve the user equipment with the source node or the target node.

20. The method according to claim 19, wherein the configuration information of the target node comprising at least one of the following: which part of radio bearers of the user equipment that the anchor node admits, which part of the radio bearer of the user equipment that the target node admits, a dedicated preamble code as required for accessing to the target node, system information relating to the target node, and configuration information of a control plane protocol for establishing communication between the user equipment and the target node.

21. A non-transitory computer readable storage medium encoded with computer-readable instructions thereon, the computer-readable instructions, when executed by a computer, cause the computer to perform a communication method for a user equipment in a communication system comprising an anchor node, a source node, a target node and the user equipment, the communication method comprising acquiring configuration information of the target node from the anchor node in response to a change procedure which is initiated by the anchor node by requesting the target node to admit radio bearers of the user equipment in case that a predetermined condition of changing the source node which serves the user equipment together with the anchor node over different carriers to the target node is satisfied;

releasing the source node and accessing to the target node based on the configuration information; and receiving data which is forwarded by the source node to at least one of the anchor node and the target node based on a result of radio bearers admission of the target node;

wherein the anchor node is kept in connection with the user equipment to jointly serve the user equipment with the source node or the target node.

* * * * *